United States Patent
Su et al.

(10) Patent No.: US 10,080,026 B2
(45) Date of Patent: Sep. 18, 2018

(54) SIGNAL RESHAPING APPROXIMATION

(71) Applicant: DOLBY LABORATORIES LICENSING CORPORATION, San Francisco, CA (US)

(72) Inventors: Guan-Ming Su, Fremont, CA (US); Qiuwei Wang, College Park, MD (US); Hsuan-Ting Chou, New Taipei (TW); Navaneeth Kamballur Kottayil, Edmonton (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/546,792

(22) PCT Filed: Mar. 17, 2016

(86) PCT No.: PCT/US2016/022772
§ 371 (c)(1),
(2) Date: Jul. 27, 2017

(87) PCT Pub. No.: WO2016/153896
PCT Pub. Date: Sep. 29, 2016

(65) Prior Publication Data
US 2018/0020224 A1    Jan. 18, 2018

Related U.S. Application Data

(60) Provisional application No. 62/136,402, filed on Mar. 20, 2015, provisional application No. 62/199,391, filed on Jul. 31, 2015.

(51) Int. Cl.
*H04N 7/12* (2006.01)
*H04N 19/169* (2014.01)
(Continued)

(52) U.S. Cl.
CPC ....... *H04N 19/1887* (2014.11); *H04N 19/179* (2014.11); *H04N 19/192* (2014.11); *H04N 19/70* (2014.11)

(58) Field of Classification Search
None
See application file for complete search history.

(56) References Cited

U.S. PATENT DOCUMENTS 9,264,681 B2   2/2016   Gish
9,497,456 B2   11/2016  Su
(Continued)

FOREIGN PATENT DOCUMENTS

EP    0742674    4/2014
JP    2013-153508  8/2013
(Continued)

OTHER PUBLICATIONS

Winken M. et al., "Bit-Depth Scalable Video Coding", Image Processing ICIP 2007, IEEE International Conference on, IEEE, pp. 1-5, XP031157664, Sep. 1, 2007.
(Continued)

*Primary Examiner* — James M Anderson, II

(57) ABSTRACT

Statistical values are computed based on received source images. An adaptive reshaping function is selected for one or more source images based on the one or more statistical values. A portion of source video content is adaptively reshaped, based on the selected adaptive reshaping function to generate a portion of reshaped video content. The portion of source video content is represented by the one or more source images. An approximation of an inverse of the selected adaptive reshaping function is generated. The reshaped video content and a set of adaptive reshaping parameters defining the approximation of the inverse of the selected adaptive reshaping function are encoded into a reshaped video signal. The reshaped video signal may be
(Continued)

processed by a downstream recipient device to generate a version of reconstructed source images, for example, for rendering with a display device.

20 Claims, 11 Drawing Sheets

(51) Int. Cl.
*H04N 19/70* (2014.01)
*H04N 19/192* (2014.01)
*H04N 19/179* (2014.01)

(56) References Cited

U.S. PATENT DOCUMENTS

| | | |
|---|---|---|
| 9,584,811 B2 | 2/2017 | Su |
| 9,628,808 B2 | 4/2017 | Su |
| 2002/0171852 A1 | 11/2002 | Zhang |

FOREIGN PATENT DOCUMENTS

| | | |
|---|---|---|
| JP | 2014-518030 | 7/2014 |
| JP | 2014-531821 | 11/2014 |
| RU | 2009620 | 3/1994 |
| WO | 2014/204865 | 12/2014 |
| WO | 2016/049327 | 3/2016 |
| WO | 2016/140954 | 9/2016 |

OTHER PUBLICATIONS

Khan I. et al., "A New Encoding Scheme for HDR Images", Signal Processing and Communications 2007, ICSPC 2007, IEEE International Conference on, IEEE, Piscataway NJ, USA, pp. 1495-1498, XP031380818, Nov. 24, 2007.

Pu F. et al., "Comments on Reshaping for HDR/WCG compression", 113, MPEG Meeting Oct. 19, 2015-Oct. 23, 2015 Geneva (Motion Picture Expert Group or ISO/IEC JTC1/SC29/WG11), No. m37267, XP030065635, pp. 1-6, Oct. 21, 2015.

SMPTE, "High Dynamic Range EOTF of Mastering Reference Displays", SMPTE ST 2084:2014, pp. 1-14, Aug. 16, 2014.

Li, Y. et al "Compressing and Companding High Dynamic Range Images with Subband Architectures" ACM Siggraph vol. 24, Issue 3, pp. 836-884, Jul. 2005.

Mai, Z. et al "Optimizing a Tone Curve for Backward-Compatible High Dynamic Range Image and Video Compression" IEEE Transactions on Image Processing, vol. 20, No. 6, Jun. 2011, pp. 1558-1571.

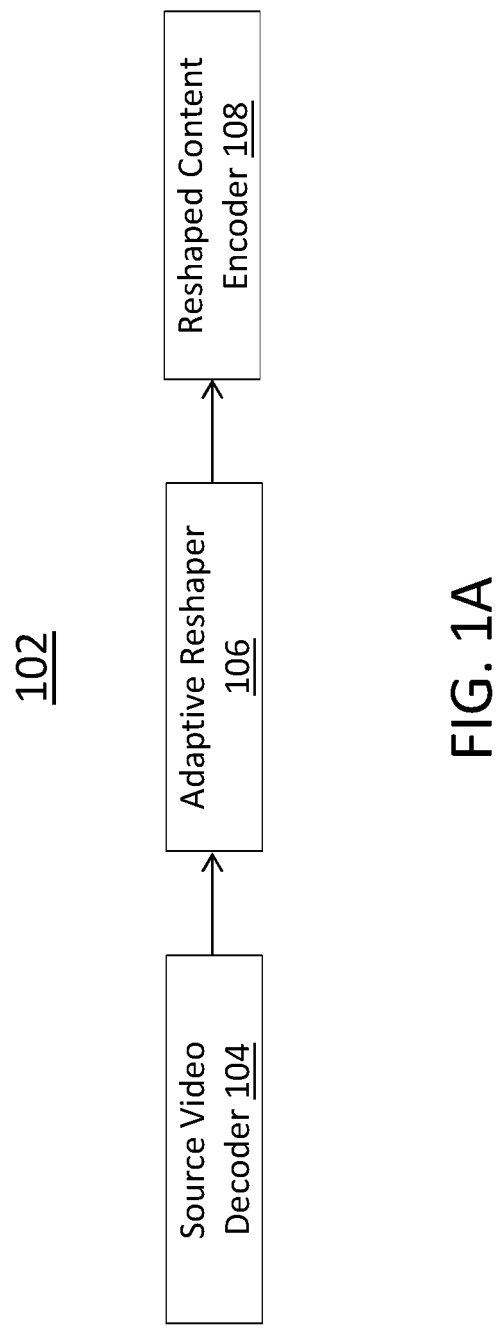

```
// for frame j blk_cnt = 0;
bright_smooth_cnt = 0;

for each block (m, n) in current picture j { minB[m][n] = min value inside block (m, n)
    maxB[m][n] = max value inside block (m, n)
    meanB[m][n] = mean value inside block (m, n)

// check bright region
    if ( ( ( maxB[m][n] – minB[m][n] ) < $T_e$ ) && ( meanB[m][n] > $T_b$ ) ){
        bright_smooth_cnt ++;
    } blk_cnt ++;
} bright_smooth_flag( j ) = ( bright_smooth_cnt / blk_cnt > $P_b$ ) ? 1 : 0
```

FIG. 4A

```
// for frame j
dark_pixel_cnt = 0;
for each pixel i in current picture j {
    if ( p_i < T_d ){
        dark_pixel_cnt ++;
    }
}
Dark_pixel_flag( j ) = ( dark_pixel_cnt / M > P_d ) ? 1 : 0
```

FIG. 4B

```
// for frame j

Non_PurBlack_blk_cnt = 0;
DB_cnt = 0;
for each block (m, n) in current picture j { stdB[m][n] = standard deviation value inside block (m,n)

// check dark region , but exclude pure black blocks (such as slate, letter box)
    if ( ( maxB[m][n] – minB[m][n] ) > 0 ) }
        Non_PurBlack_blk_cnt ++;
        if( ( stdB[m][n] < $T_{std}$ ) && ( meanB[m][n] < $T_s$ ) ){
            DB_cnt ++;
        }
    }
}

// find 8-connected neighbor in DB[m][n];
// find the biggest area and count the number of blocks inside it as DB_cnt;

Dark_pixel_flag( j ) = (DB_cnt > $P_{bd}$*Non_PurBlack_blk_cnt ) ? 1 : 0
```

FIG. 4C

SIGNAL RESHAPING APPROXIMATION

CROSS REFERENCES TO RELATED APPLICATIONS

The present invention claims the benefit of U.S. Provisional Patent Application No. 62/136,402, filed on Mar. 20, 2015, and U.S. Provisional Patent Application No. 62/199,391, filed on Jul. 31, 2015, which are hereby incorporated by reference in their entirety.

TECHNOLOGY

The present invention relates generally to image processing, and in particular, to encoding, decoding, and representing video data.

BACKGROUND

Video data as provided by upstream devices to downstream devices may support a variety of dynamic ranges, color spaces, etc. Dynamic ranges may vary from a brightness levels of 10,000 nits, 12,000 nits, or even more at a high end to a brightness levels of 100 nits, 300 nits, 600 nits, etc., at a low end. Color spaces may include, without limitation, linear color spaces, non-linear color spaces, perceptually quantized color spaces, etc.

In addition, metadata related to operational parameters used for encoding video data by upstream devices may be needed by downstream devices to generate operational parameters used for decoding video signals generated by the upstream devices. The amount of metadata that would be needed by downstream devices for relatively high quality decoding operations might be too large to be transmitted to and/or processed by many of the downstream devices.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 1A illustrates a video encoder;
FIG. 4A through FIG. 4C illustrate example algorithms for classifying images.

DESCRIPTION OF EXAMPLE EMBODIMENTS

Figure 1B:
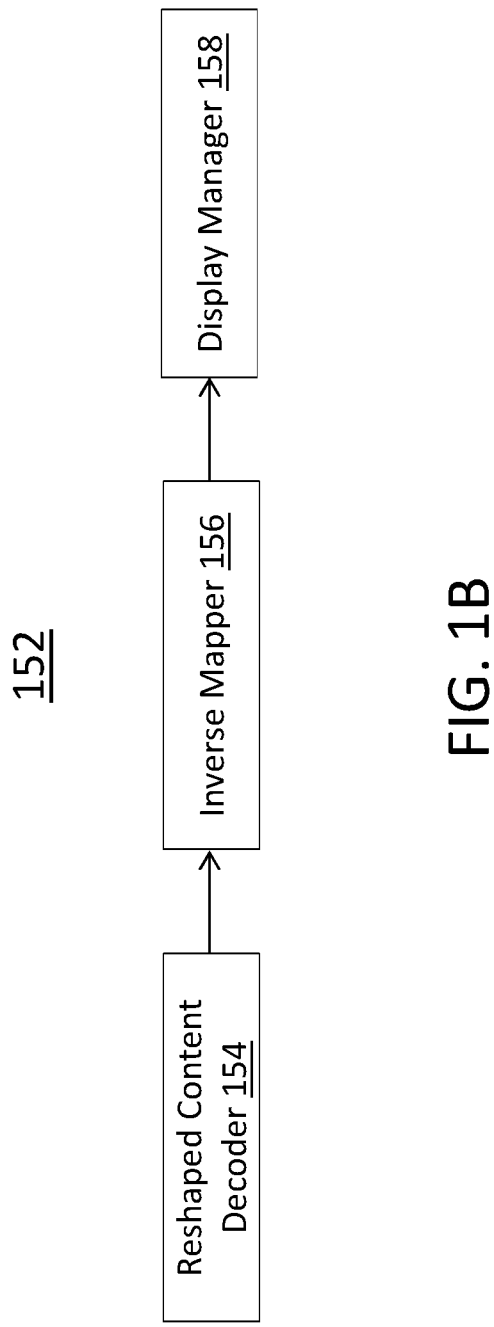
FIG. 1B illustrates a video decoder.

Example embodiments, which relate to encoding, decoding, and representing video data, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. ENCODING ADAPTIVELY RESHAPED VIDEO CONTENT
3. DECODING ADAPTIVELY RESHAPED VIDEO CONTENT
4. POWER FUNCTIONS FOR ADAPTIVE RESHAPING
5. APPROXIMATING FUNCTIONS RELATED TO ADAPTIVE RESHAPING
6. EXAMPLE PROCESS FLOWS
7. REAL-TIME OPTIMIZATIONS
8. IMPLEMENTATION MECHANISMS—HARDWARE OVERVIEW
9. EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below.

Without using adaptive reshaping as described herein, a video codec allocates available codewords at a relatively low bit depth (e.g., dual channel 8-bit video signals, single channel 10-bit video signals, etc.) in a manner that may not preserve visual details of source video content (e.g., reference coded video content, PQ reference coded video content, etc.) originally encoded with available codewords at a relatively high depth. For example, a codec (e.g., a gamma-domain codec, etc.) without using adaptive reshaping as described herein may over-allocate codewords to high luminance sub-ranges (e.g., bright portions, highlights, etc.) and under-allocate codewords to a low luminance sub-range (e.g., dark portions, dark areas, etc.). As a result, visual details of perceptually encoded source video content may be unnecessarily lost under these other techniques.

A video codec implementing adaptive reshaping techniques as described herein allocates available codewords at a particular bit depth (e.g., 8 bits, etc.) in a way that preserves visual details in a wide variety of source video content. In some embodiments, a video codec selects/determines specific parameter values (e.g., exponent values in power functions, slopes in linear quantization, pivots in piecewise linear quantization, etc.) based on results of analyzing image content carried by image frames (e.g., in a scene, etc.) in source video content. If the image content comprises more highlight portions or more luminance levels, the parameter values can be selected/determined to cause more represented luminance levels in the high luminance sub-range to be available for encoding or decoding operations. If the image content comprises fewer highlight portions or fewer luminance levels, the parameter values can be selected/determined to cause fewer represented luminance levels in the high luminance sub-range to be available for encoding or decoding operations. Similarly, if the image content comprises more dark portions or more luminance levels, the parameter can be selected/determined to cause more represented luminance levels in the low luminance sub-range to be available for encoding or decoding operations. If the image content comprises fewer dark portions or fewer luminance levels, the parameter values can be selected/determined to cause fewer represented luminance levels in the low luminance sub-range to be available for encoding or decoding operations.

Techniques as described herein can be used to support coding operations (e.g., encoding, decoding, transcoding, etc.) for video signals (e.g., coded bitstreams, etc.) that comprise either a single layer, or more than one layer (e.g., dual layer, multi-layer, a combination of a base layer and one or more enhancement layers, etc.). These techniques may be implemented with software, hardware, a combination of software and hardware, and may be adopted by a variety of computing devices, multimedia devices, mobile devices, etc. At least some of the techniques may be packaged as one or more technical feature profiles (e.g., a mobile profile, a tablet profile, a home entertainment system profile, etc.), which can be released independently or in combination to other vendors, developers, manufacturers, etc.

A video codec that implements techniques as described herein for adaptive reshaping video signal may be used to support one or more of backward compatible (BC) video applications, non-backward compatible (NBC) video applications, etc. Examples of systems with such a video codec may include, but are not limited to only, any of: a single-layer 12-bit codec, a dual-layer 8-bit codec, a multi-layer codec, a non-backward compatible reshaping codec, a backward compatible codec, a codec implementing a set of settings/requirements/options in Advanced Video Coding (AVC), a codec implementing a set of settings/requirements/options in High Efficiency Video Coding (HEVC), etc.

Some examples of non-backward compatible reshaping codec are described in PCT Patent Application No. PCT/US2014/031716, filed on Mar. 25, 2014, owned by the assignee of the present application, the content of which are incorporated by reference for all purposes as if fully set forth herein. Some examples of backward compatible reshaping codec are described in PCT Patent Application No. PCT/US2012/062932, filed on Nov. 1, 2012, owned by the assignee of the present application, the content of which are incorporated by reference for all purposes as if fully set forth herein.

In some embodiments, a codec system as described herein implements a curve approximation method to approximate an arbitrary reshaping function using a limited number of polynomials that minimize an overall maximum error. Additionally, optionally, or alternatively, the codec system may implement an adaptive parameter selection algorithm to determine or choose adaptive reshaping parameters used in connection with the reshaping function to achieve better perceptual quality than otherwise.

A source video package for a media program can be of a relatively large file size as the source video package may comprise source video content with relatively high spatial resolution (e.g., 4 k, 8 k, etc.), relatively large dynamic range, relatively wide color gamut. In some embodiments, source video content that has been encoded in a relatively high bit depth video signal (e.g., 12-bit video signal, 14+ bit video signal, etc.) may be transcoded into encoded video content of a much smaller size based at least in part on adaptive signal reshaping.

For example, the source content may be encoded in a 12-bit PQ video signal with source codewords that correspond to (e.g., fixed, non-adaptively reshaped, etc.) luminance-related or chroma-related values from image to image, from scene to scene, from media program to media program, etc.

The term "PQ" as used herein refers to perceptual luminance amplitude quantization. The human visual system responds to increasing light levels in a very non-linear way. A human's ability to see a stimulus is affected by the luminance of that stimulus, the size of the stimulus, the spatial frequencies making up the stimulus, and the luminance level that the eyes have adapted to at the particular moment one is viewing the stimulus. In an embodiment, a perceptual quantizer function maps linear input gray levels to output gray levels that better match the contrast sensitivity thresholds in the human visual system. Examples of PQ mapping functions (or EOTFs) are described in SMPTE ST 2084:2014 "High Dynamic Range EOTF of Mastering Reference Displays," which is incorporated herein by reference in its entirety, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidently may have a very rough similarity to the way the human visual system responds, a PQ curve imitates the true visual response of the human visual system using a relatively simple functional model.

The source content encoded in the 12-bit PQ video signal may have a relatively high dynamic range such as a dynamic range up to 12,000 nits, etc. In contrast, the encoded video content may be encoded in a 10-bit video signal with adaptively reshaped codewords that do not necessarily correspond to fixed luminance-related or chroma-related values from image to image, from scene to scene, from media program to media program, etc. The adaptively reshaped codewords in a 10-bit codeword space may be (e.g., adaptively, etc.) mapped to the source codewords in a 12-bit codeword space based on an adaptive reshaping function that can vary from image to image, from scene to scene, from media program to media program, etc. As a result, the encoded video content, while being encoded in a 10-bit signal, may support a relatively high dynamic range, even up to the entire dynamic range supported by the source video content, which is encoded in a 12-bit signal. The adaptive reshaping function may be represented by one or more of quantization curves, lookup tables (LUTs), codeword mappings, etc.

In some embodiments, some or all of the quantization curves, lookup tables (LUTs), codeword mappings, etc., which represents the adaptive reshaping function used by an upstream device to perform adaptive reshaping of the source video signal, may be transmitted as composition metadata with the encoded video content encoded in the 10-bit signal from the upstream device (e.g., a video encoder, a video transcoder, etc.) directly or indirectly to downstream recipient devices (e.g., a video decoder, a video transcoder, etc.).

The adaptive reshaping function, as represented by the quantization curves, lookup tables (LUTs), codeword mappings, etc., may be used by the downstream recipient devices to reconstruct a version of the source video content from the encoded video content. For example, the adaptively reshaped codewords in the encoded video content may be inversely mapped, based on the adaptive reshaping function or an inverse thereof, to a set of codewords (e.g., in a 12-bit codeword space, etc.) equivalent to the source codewords that were in the source video content.

The composition metadata, which includes a representation of the adaptive reshaping function, may be too large to be transmitted and/or processed by some downstream devices. Downstream devices with difficulties to process relatively large amounts of metadata (e.g., related to video processing such as composition metadata, etc.) may include, but are not limited to only, any of: mobile devices, small footprint devices, computing devices with relatively limited capabilities for video processing, computing devices that incorporate system-on-chip (SoC) modules with relatively limited capabilities for video processing, computing devices that incorporate video signal formats, implementations, designs, hardware, software, firmware, etc., that support transmission/reception of relatively small amounts of metadata, etc.

Under techniques as described herein, an adaptive reshaping function can be approximated by a limited number of simple mathematical functions such as polynomials, piecewise linear (PWL) segments, etc. In a non-limiting example embodiment, an adaptive reshaping function is approximated by a limited number (e.g., 4, 8, 12, a different positive integer number greater than one, etc.) of polynomial functions (e.g., linear, $2^{nd}$ order, etc.) with a limited number of bits for each coefficient and with minimized approximation errors. The minimized approximation errors in the approximation of the adaptive reshaping function with the limited number of polynomial functions are conducive to minimize errors in inverse mapping that is performed based on the approximation of the adaptive reshaping function with the limited number of polynomial functions.

Adaptive reshaping can be performed on various video signals and/or video content in many different forms. In particular, techniques as described herein are applicable in approximating any adaptive reshaping function including but not limited to an arbitrary LUT.

In some example embodiments, mechanisms as described herein form a part of a media processing system, including but not limited to any of: a handheld device, game machine, television, laptop computer, netbook computer, tablet computer, cellular radiotelephone, electronic book reader, point of sale terminal, desktop computer, computer workstation, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Encoding Adaptively Reshaped Video Content

FIG. 1A illustrates an example video encoder 102 that can be used as an upstream device to deliver an output video signal (or a reshaped video signal) encoded with adaptively reshaped video content to downstream devices (one of which may be, for example, a video decoder 152 of FIG. 1B, etc.). The video encoder (102) may be implemented with one or more computing devices. In some embodiments, the video encoder (102) comprises a source content decoder 104, an adaptive content reshaper 106, a reshaped content encoder 108, etc.

In some embodiments, the source content decoder (104) comprises software, hardware, a combination of software and hardware, etc., configured to receive one or more source video signals (e.g., coded bitstreams, etc.), decode the source video signals into source video content. In some embodiments, the source video content is decoded from a single layer video signal encoded with the source video content in a single layer. In some embodiments, the source video content is decoded from a multi-layer encoded video signal encoded with the source video content in more than one layer (e.g., a base layer and one or more enhancement layers, etc.).

In some embodiments, the adaptive content reshaper (106) comprises software, hardware, a combination of software and hardware, etc., configured to carry out adaptive reshaping operations on the source video content to generate reshaped video content. One or both of the source video content or the reshaped content may be used for one or more of backward compatible (BC) video applications, non-backward compatible (NBC) video applications, etc.

In some embodiments, the adaptive content reshaper (106) is configured to select and apply a reshaping function to reshape source code words in one or more images, one or more scenes, etc., represented in the source video content into reshaped code words in one or more corresponding images, one or more corresponding scenes, etc., represented in the reshaped video content. Under techniques as described herein, the selection of the reshaping function and/or adaptive reshaping parameters used in the reshaping function is adaptively made based on actual content in the images, scenes, etc., as represented in the source video content. Additionally, optionally, or alternatively, the selection of the reshaping function and/or adaptive reshaping parameters used in the reshaping function may be adaptively made while these images, scenes, etc., are being processed by the video encoder (102).

The adaptive content reshaper (106) may, but is not limited to, be configured to use forward power functions as reshaping functions. The adaptive content reshaper (106) can be configured to determine whether an image contains large smooth bright areas, large dark black areas, etc., whether an image is a mid-tone image, etc. Based on such determination, adaptive reshaping parameters such as exponent values of the forward power functions, etc., may be selected.

In some embodiments, the adaptive content reshaper (106) applies adaptive reshaping operations on source code words in source video content directly based on a selected adaptive reshaping function with selected adaptive reshaping parameters.

In some embodiments, an adaptive reshaping function may be represented by an LUT that comprises a plurality of entries each of which maps a source codeword in a set of available source codewords used to encode the source video content to a reshaped codeword in a set of available reshaped codeword used to encode the reshaped video content. A first LUT used to reshape one or more first images in the source video content may be different from a second LUT used to reshape one or more second images in the source video content. In some embodiments, the set of available source codewords may remain the same for both the first images and the second images. For example, if the adaptive content reshaper (106) determines that the first images are smooth bright images, then the LUT, or the adaptive reshaping function the LUT represents, may have a relatively large number of available reshaped codewords corresponding to bright luminance values. As a result, contouring/banding artifacts can be reduced or avoided even when the reshaped video content is encoded into a reshaped video signal (e.g., dual layer 8-bit video signal, single layer 10-bit video signal, etc.) with a bit depth lower than a source video signal (e.g., 12-bit video signal, 14+ bit video signal, etc.). On the other hand, if the adaptive content reshaper (106) determines that the second images are smooth dark images (but not pure black image), then the LUT, or the adaptive reshaping function the LUT represents, may have a relatively large number of available reshaped codewords corresponding to dark luminance values. As a result, image details in dark areas can be preserved in the reshaped video content encoded in the reshaped video signal. In some embodiments, the adaptive content reshaper (106) applies adaptive reshaping operations on source code words in source video content based on an LUT, which LUT may be generated based on a selected adaptive reshaping function, or which LUT itself may be considered as a selected adaptive reshaping function.

In some embodiments, the adaptive content reshaper (106) determines an approximation of a (target) LUT that represents, or is equivalent to, a reshaping function. For example, the adaptive content reshaper (106) may, but is not limited to only, approximate the LUT by polynomials with specifically determined coefficients to minimize errors between the mapping represented by the polynomials and the mapping represented by the target LUT. In some embodiments, the adaptive content reshaper (106) applies adaptive reshaping operations on source code words in source video content based on the polynomials that approximate the target LUT, or a reshaping function represented by the LUT.

Regardless of which way the video encoder (102) may apply adaptive reshaping operations (e.g., based on a reshaping function such as an analytical or non-analytical function or a piecewise analytical function, based on an LUT that may or may not represent an analytical function, based on an approximation of an LUT that may or may not be generated based on an analytical function, etc.), the video encoder (102) may be configured to generate one or more types of adaptive reshaping parameters and transmit at least one of the one or more types of adaptive reshaping parameters to downstream recipient devices.

In some embodiments, the adaptive content reshaper (106) is configured to determine an approximation of a (target) LUT (or a backward LUT) that represents an inverse of a reshaping function. Composition metadata defining the approximation of the target LUT that represents the inverse of the reshaping function may be generated and transmitted as a part of overall metadata carried in the reshaped video signal by the video encoder (102) to downstream recipient devices such as a video decoder 152 of FIG. 1B, etc.

In some embodiments, the video decoder (152) may be configured to receive or reconstruct the approximation of the target LUT that represents the inverse of the reshaping function based on the composition metadata decoded/extracted from the reshaped video signal. The video decoder (152) may be configured to apply inverse mapping operations on reshaped video content originated from the video encoder as decoded from the reshaped video signal using the approximation of the target LUT, regardless of whether the adaptive content reshaper (106) applies adaptive reshaping operations on source code words in source video content based on a reshaping function, or alternatively based on a forward LUT that represents the reshaping function, or alternatively based on an approximation of the forward LUT.

Additionally, optionally, or alternatively, in some embodiments, the adaptive content reshaper (106) is configured to generate composition metadata defining a target LUT that represents the inverse of a reshaping function and transmit the composition metadata as a part of overall metadata carried in the reshaped video signal by the video encoder (102) to downstream recipient devices such as a video decoder 152 of FIG. 1B, etc. In some embodiments, the video decoder (152) may be configured to receive or reconstruct the target LUT based on the composition metadata decoded/extracted from the reshaped video signal. The video decoder (152) may be configured to apply inverse mapping operations on reshaped video content originated from the video encoder as decoded from the reshaped video signal using the target LUT, regardless of whether the adaptive content reshaper (106) applies adaptive reshaping operations on source code words in source video content based on a reshaping function, or alternatively based on a forward LUT that represents the reshaping function, or alternatively based on an approximation of the forward LUT.

Additionally, optionally, or alternatively, in some embodiments, the adaptive content reshaper (106) is configured to generate composition metadata defining an inverse of a reshaping function and transmit the composition metadata as a part of overall metadata carried in the reshaped video signal by the video encoder (102) to downstream recipient devices such as a video decoder 152 of FIG. 1B, etc. In some embodiments, the video decoder (152) may be configured to receive or reconstruct the inverse of the reshaping function based on the composition metadata decoded/extracted from the reshaped video signal. The video decoder (152) may be configured to apply inverse mapping operations on reshaped video content originated from the video encoder as decoded from the reshaped video signal using the inverse of the reshaping function, regardless of whether the adaptive content reshaper (106) applies adaptive reshaping operations on source code words in source video content based on a reshaping function, or alternatively based on a forward LUT that represents the reshaping function, or alternatively based on an approximation of the forward LUT.

In some embodiments, the reshaped content encoder (108) comprises software, hardware, a combination of software and hardware, etc., configured to encode the reshaped video content into a reshaped video signal (e.g., a dual layer 8-bit video signal encoded with the reshaped video signal, a single layer 10-bit video signal encoded with the reshaped video signal, etc.). Additionally, optionally, or alternatively, the video encoder (102), or the reshaped content encoder therein, outputs metadata comprising some or all of operational parameters used in the operations of the video encoder (102) as a part of the reshaped video signal to a downstream device (e.g., the video decoder 152 of FIG. 1B, etc.). The operational parameters in the metadata transmitted to downstream devices include but are not limited to, any of: composition metadata comprising adaptive reshaping parameters defining reshaping functions or inverses thereof, composition metadata defining LUTs that represent reshaping functions or inverses thereof, composition metadata defining approximations of one or more of reshaping functions or inverses of reshaping functions, one or more of tone mapping parameters, clipping parameters, exponent values used in power functions for gamma compression, inverse mapping parameters, LUTs, pivot values in piecewise linear (PWL) functions, non-linear quantization parameters, the non-linear quantization (NLQ) parameters, etc. The metadata may be a part of data carried in layers containing encoded video content, or in a separate sub-bitstream of an overall video bitstream, for example, as a part of supplemental enhancement information (SEI) or other similar metadata carriages available in the video bitstream. An example sub-bitstream may be a reference processing unit (RPU) stream developed by Dolby Laboratories, Inc.

As used herein, the term "bit depth" refers to the number of bits provided in a coding space that provides available codewords to encode or quantize image data; an example of low bit depth is 8 bits; an example of high bit depth is 12 bits or more.

As used herein video content may comprise a sequence of images or frames. As used herein, a "source image" may refer to an image such as a scene-referred image captured by a high-end image acquisition device, a reference coded image, a PQ coded image, etc. A source image may comprise codewords available in a codeword space of a relatively large bit depth.

An image such as a source image, a reshaped image, a reconstructed image, etc., may be in any color space. For example, a source image may be a 12+ bit image in an YCbCr color space, in an RGB color space, in an XYZ color space, in an YDzDx color space, in an IPT color space, etc. In an example, each pixel represented in an image comprises codewords for all channels (e.g., RGB channels, luma and chroma channels, XYZ channels, YDzDx channels, IPT channels, etc.) defined for a color space (e.g., an YCbCr color space, an RGB color space, an XYZ color space, an YDzDx color space, an IPT color space, etc.). Each codeword comprises upsampled or downsampled codewords for one or more of the channels in the color space. In an example embodiment, the video encoder (102) is configured to perform color space transformation related to an image from a first color space (e.g., an RGB color space, etc.) to a second different color space (e.g., a YCbCr color space, etc.).

In an example embodiment, the video encoder (102) is configured to downsample or upsample an image in a first sampling format (e.g., in a 4:4:4 sampling format, etc.) to a second different sampling format (e.g., in a 4:2:0 sampling format, etc.).

Examples of a video encoder that implements signal reshaping and other operations include, but are not limited to only, any of: one or more single-layer 12-bit codecs, one or more dual-layer 8-bit codecs, one or more multi-layer codecs, one or more non-backward compatible reshaping codecs, one or more backward compatible codecs, one or more codecs implementing a set of settings/requirements/options in AVC, one or more codecs implementing a set of settings/requirements/options in HEVC, H.264/AVC/HEVC, MPEG-2, VP8, VC-1, etc.

3. Decoding Adaptively Reshaped Video Content

FIG. 1B illustrates an example video decoder 152 that can be used as a downstream device to process an input video signal (or a reshaped video signal) encoded with adaptively reshaped video content from upstream devices (one of which may be, for example, a video encoder 102 of FIG. 1A, etc.). The video decoder (152) may be implemented with one or more computing devices. In some embodiments, the video decoder (152) comprises a reshaped content decoder 154, an inverse mapper 156, a display manager 158, etc.

In some embodiments, the reshaped content decoder (154) comprises software, hardware, a combination of software and hardware, etc., configured to receive one or more input video signals (e.g., coded bitstreams, etc.), decode the input video signals into reshaped video content. In some embodiments, the reshaped video content is decoded from a single layer video signal (e.g., a single channel 10-bit video signal, etc.) encoded with the reshaped video content in a single layer. In some embodiments, the reshaped video content is decoded from a multi-layer encoded video signal (e.g., a dual channel 8-bit video signal, etc.) encoded with the reshaped video content in more than one layer (e.g., a base layer and one or more enhancement layers, etc.).

In some embodiments, the inverse mapper (156) comprises software, hardware, a combination of software and hardware, etc., configured to carry out inverse mapping operations on the reshaped video content to generate a reconstructed version of source video content used by an upstream device to generate the reshaped video content. One or both of the reconstructed video content or the reshaped content may be used for one or more of backward compatible (BC) video applications, non-backward compatible (NBC) video applications, etc.

In some embodiments, a reshaping function has been adaptively selected by an upstream device (e.g., the video encoder 102 of FIG. 1A, etc.) to reshape source code words in one or more images, one or more scenes, etc., represented in the source video content into reshaped code words in one or more corresponding images, one or more corresponding scenes, etc., represented in the reshaped video content. Under techniques as described herein, the selection of the reshaping function and/or adaptive reshaping parameters used in the reshaping function is adaptively made based on actual content in the images, scenes, etc., as represented in the source video content.

Examples of reshaping functions may include, but are not limited to only, forward power functions, etc. Adaptive reshaping parameters used in a reshaping function applied to reshape an image in the upstream device may be determined/selected by the upstream device based on whether the image contains large smooth bright areas, large dark black areas, etc., whether an image is a mid-tone image, etc.

In some embodiments, the reshaped video content received by the video decoder (152) is generated by the upstream device applying adaptive reshaping operations on source code words in source video content directly based on a selected adaptive reshaping function with selected adaptive reshaping parameters.

In some embodiments, the reshaped video content received by the video decoder (152) is generated by the upstream device based on an LUT (e.g., a forward LUT, etc.), which may or may not be generated based on a selected adaptive reshaping function.

In some embodiments, the reshaped video content received by the video decoder (152) is generated by the upstream device based on an approximation of a (target) LUT that represents, or is equivalent to, a reshaping function. The approximation may or may not be based on polynomials.

Regardless of which way the reshaped video content received by the video decoder (152) is generated by the upstream device, the video decoder (152), or the inverse mapper (156) therein, may be configured to obtain adaptive reshaping parameters by decoding composition metadata that is transmitted as a part of metadata carried in the input video signal received by the video decoder (152).

In some embodiments, based on the decoded adaptive reshaping parameters, the inverse mapper (156) is configured to determine an approximation of a (target) LUT (or a backward LUT) that represents an inverse of a reshaping function (e.g., a reshaping function used by the upstream device to perform adaptive reshaping on one or more images, etc.). The video decoder (152), or the inverse mapper (156) therein, may be configured to generate a reconstructed version of the source video content (used by the upstream device to generate the reshaped video content received by the video decoder 152) by applying inverse mapping operations on reshaped video content originated from the video encoder as decoded from the reshaped video signal using the approximation of the target LUT, regardless of whether the upstream device applies adaptive reshaping operations on source code words in source video content based on a reshaping function, or alternatively based on a forward LUT that represents the reshaping function, or alternatively based on an approximation of the forward LUT.

In some embodiments, the display manager (158) comprises software, hardware, a combination of software and hardware, etc., configured to perform video processing operations such as display management operations, etc., on the reconstructed version of the source video content. Example display management operations may include, but are not limited to only, any of: tone mapping operations, clipping operations, color gamut adaptation operations, etc. Some or all of these operations may be device specific. Through these operations, images represented in the reconstructed version of the source video content can be rendered by a display device that may be a part of the same device that includes the video decoder (152), may be operating in conjunction with the video decoder (152), etc.

In an example embodiment, the video decoder (152) is configured to upsample or downsample an image in a first sampling format (e.g., in a 4:2:0 sampling format, etc.) to a second different sampling format (e.g., in a 4:4:4 sampling format, etc.).

Examples of a video decoder that implements inverse mapping, inverse signal reshaping and other operations include, but are not limited to only, any of: one or more single-layer 12-bit codecs, one or more dual-layer 8-bit codecs, one or more multi-layer codecs, one or more non-backward compatible reshaping codecs, one or more backward compatible codecs, one or more codecs implementing a set of settings/requirements/options in AVC, one or more codecs implementing a set of settings/requirements/options in HEVC, H.264/AVC/HEVC, MPEG-2, VP8, VC-1, etc.

4. Power Functions for Adaptive Reshaping

In some embodiments, adaptive reshaping may be effectively performed with power functions, for example, on video signals that support extended dynamic ranges (EDR) (e.g., up to 6,000 nits, 12,000 nits, 20,000+ nits, etc.). Power functions can be used to compress a relatively high bit rate source video signal such as a 12+ bit perceptually quantized (PQ) video signal, etc., into a relatively low bit rate adaptively shaped video signal such as an 8-bit or 10-bit adaptively reshaped video signal, etc. Optimal adaptive reshaping parameters can be selected based at least in part on content in the source video signal, in order to reduce or present visual artifacts in the adaptively reshaped video signal. The selection of these optimal adaptive reshaping parameters can be automatically made by an upstream device for a current image, a current scene, etc., as represented in the source video signal, as the current image, the current scene, etc., is being processed and adaptively reshaped/compressed by the upstream device into an image, a scene, etc., represented in the adaptively reshaped video signal. Some examples of adaptive reshaping with power functions are described in PCT Patent Application No. PCT/US2014/031716, filed on Mar. 25, 2014, owned by the assignee of the present application, the content of which are incorporated by reference for all purposes as if fully set forth herein.

In an example embodiment, adaptive reshaping is performed by an upstream device such as a video encoder, etc., with a forward power function as follows:

$$s_i = \text{round}\left(\left(C_H^Y - C_L^Y\right)\left(\frac{v_i - v_L^Y}{v_H^Y - v_L^Y}\right)^\alpha + C_L^Y\right) \quad (1)$$

where $\alpha$ represents an exponent value; $v_i$ represents source codewords (e.g., source luminance codewords, etc.) decoded from a source video signal that is being reshaped by the video encoder; $s_i$ represents adaptively reshaped codewords (e.g., adapted/mapped luminance codewords, etc.) adapted/mapped from $v_i$ with the forward power function; round( . . . ) represents a rounding function; $C_L^Y$ and $C_H^Y$ are minimum and maximum values, respectively, of the adaptively shaped codewords (e.g., adapted/mapped luminance codewords, etc.); $v_L^Y$ and $v_H^Y$ are minimum and maximum values, respectively, of the source codewords (e.g., source luminance codewords, etc.). Additionally, optionally, or alternatively, in some embodiments, a clipping function may be used to ensure that any out-of-range (e.g., out of the range $[C_L^Y, C_H^Y]$, etc.) codeword after lossy compression can still be inversely mapped by a downstream recipient device such as a video decoder, etc., to the closest valid reconstructed source codeword.

Inverse mapping can be performed by a downstream recipient device such as a video decoder, etc., with a backward power function as follows:

$$\bar{v}_i = (v_H^Y - v_L^Y)\left(\frac{s_i - C_L^Y}{C_H^Y - C_L^Y}\right)^{1/\alpha} + v_L^Y \quad (2)$$

where $\bar{v}_i$, represents reconstructed source codewords (e.g., reconstructed source luminance codewords, etc.) inversely mapped from reshaped codewords decoded from an adaptively reshaped video signal that has been reshaped by an upstream device such as the video encoder in the present example.

In some embodiments, in the forward and backward power functions in the decoder, $C_L^Y$ and $C_H^Y$ may be set as follows:

$$C_L^Y = 0 \quad (3)$$

$$C_H^Y = \text{effective\_codewords} - 1 \quad (4)$$

where the symbol "effective_codewords" represents the number of codewords available to represent the adaptively reshaped codewords (e.g., 511 of a dual layer 8-bit video signal, 1023 in a single layer 10-bit video signal, etc.).

A reshaping function or an inverse thereof such as a forward power function, a backward power function, etc., can be represented as an LUT such as a one-dimensional LUT (1D-LUT), etc. Techniques as described herein can use an LUT that represents, or is generated based on, a reshaping function or an inverse thereof, as a target LUT for approximation with a limited number of second-order polynomials. In some embodiments, coefficients may be fixed point numbers with limited precision, for example, to comply with device-specific constraints, module specific constraints (e.g., SoC related constraints, etc.), etc.

Take a power function such as shown in expression (1) or (2) as an example, an exponent (e.g., α in the forward power function of expression (1), 1/α in the backward power function of expression (2), etc.) can be greater than one (1), making the power function as a convex function, or can be less than one (1), making the power function as a concave function. These different alpha values pose different difficulties to approximate a target LUT that is generated based on the power function.

In various embodiments, one or more algorithms may be used individually or in combination in the approximation of the target LUT. In an example, a first algorithm, denoted as a forward search algorithm, may be used to approximate the power function from small codeword values to large codeword values (or from left to right) along a horizontal coordinate axis that represents input codeword values (where a vertical coordinate axis represents mapped codeword values). As used herein, input codeword values in a LUT such as the target LUT, etc., may refer to keys in key-value pairs of the LUT, whereas mapped codeword values in the LUT may refer to values in the key-value pairs of the LUT. In another example, a second algorithm, denoted as a backward search algorithm, may be used to approximate the power function from large codeword values to small codeword values (or from right to left) along the horizontal coordinate axis. In a further example, both the first algorithm and the second algorithm may be used; results from one (e.g., generating less approximation errors, fastest converging, etc.) of these algorithms may be used to approximate the power function.

It should be noted that an adaptive reshaping function may or may not be a forward power function. Additionally, optionally, or alternatively, an inverse of a reshaping function may or may not be a backward power function. In some embodiments, an inverse of a reshaping function as described herein is represented by an optimal backward LUT (denoted as BL( )) that may be derived or deduced from any arbitrary reshaping function. The reshaping function may be used by an upstream device such as a video encoder, etc., to perform adaptive reshaping. In some embodiments, the adaptive reshaping function may be represented by a forward LUT (denoted as FL( )). The optimal backward LUT (or the optimal BL( )) may be used by a downstream device such as a video decoder, etc., to perform inverse mapping.

For each reshaped codeword value, $s_c$, used in reshaped video content, all pixels (e.g., in an image, in images of the same scene, etc.) having the same reshaped codeword value $s_c$ in the reshaped video content are grouped. Based on these pixels in the reshaped video content, a set of corresponding source codewords values $v_i$ in source video content which have been reshaped or mapped to $s_c$ are then determined or identified, as follows:

$$\omega(s_c) = \{i | FL(i) = s_c\} \quad (5)$$

For each codeword value $s_c$, if its set of corresponding source codeword values $v_i$ is not empty, then the average for all the collected source codeword values in the set is taken or computed. The average of all the collected source codeword values corresponding to each codeword value $s_c$ may be used to construct the optimal $BL(s_c)$, as follows, $$BL(s_c) = \frac{\sum_{i \in \omega(s_c)} v_i}{|\omega(s_c)|} \quad (6)$$

where $|\omega(s_c)|$ represents the number of the collected source codeword values in the set of expression (5) above.

In some embodiments, the optimal $BL(s_c)$ in expression (6) may be used as a target LUT to be approximated (e.g., by polynomials, etc.).

5. Approximating Functions Related to Adaptive Reshaping

Figure 2:
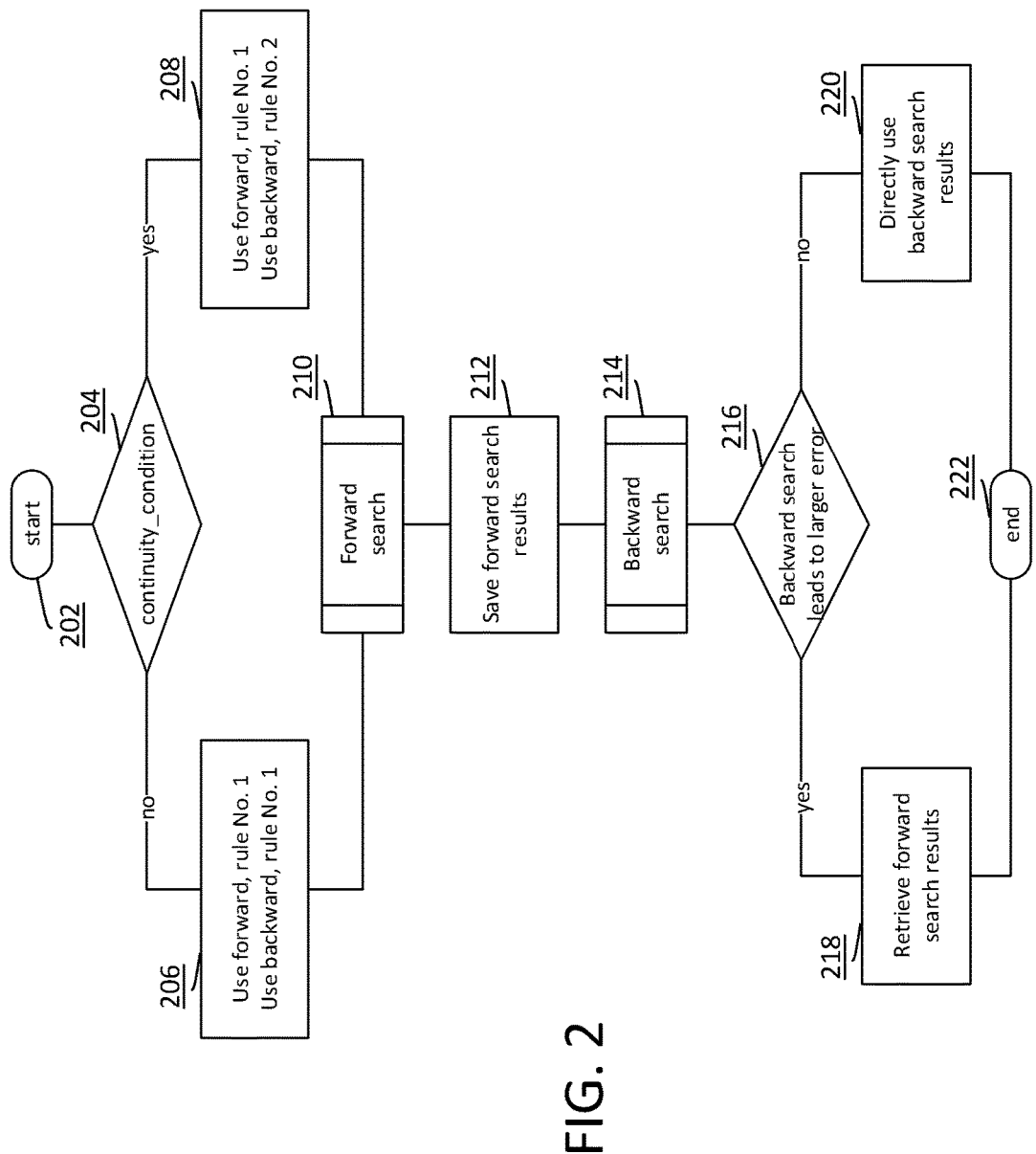
FIG. 2 illustrates an example method of approximating a reshaping function.

FIG. 2 illustrates an example method of approximating a reshaping function. One or more computing devices, one or more modules at least partly implemented in hardware in a computing device, etc., may perform this method. For example, an LUT approximation module in a video processing device such as an adaptive reshaping module in a video encoder, an inverse mapping module in a video decoder, etc., may perform some or all of the acts in the method of FIG. 2.

In block 202, the LUT approximation module starts the approximation of a target LUT by setting an initial error threshold t.

In block 204, the LUT approximation module determines whether a continuity condition is to be enforced. If so, then polynomials used to approximate the target LUT are to satisfy a constraint under which a piecewise curve formed by the polynomials is 0th order continuous; any two curve segments as represented by two neighboring polynomials of the piecewise curve join with each other. On the other hand, if the continuity condition is not to be enforced, such a constraint does not need to be satisfied by the polynomials (neighboring polynomials may or may not join with each other). The setting or unsetting of this continuity constraint may be content dependent. In an example, the LUT approximation module may determine that an image or a scene contains smooth image content. In response to such a determination, the continuity constraint may be enforced in approximating the target LUT for reshaping or inverse mapping operations on such image or scene. This may prevent color banding artifacts from occurring in relatively smooth image content. In another example, the LUT approximation module may determine that an image or a scene contains relatively highly varied image content (e.g., in terms of differences and variations of luminance values or chroma values, etc.). In response to such a determination, the continuity constraint may not be enforced in approximating the target LUT for reshaping or inverse mapping operations on such image or scene, as color banding artifacts are less likely to occur in relatively highly varied image content.

In some embodiments, the LUT approximation module may select a set of stopping rules, among one or more different sets of stopping rules, to apply in the approximation operation based on whether the continuity condition or constraint is to be enforced. In response to determining that the continuity condition is not to be enforced, in block 206, the LUT approximation module may be configured to select a first set of stopping rules. On the other hand, in response to determining that the continuity condition is to be enforced, in block 208, the LUT approximation module may be configured to select a second set of stopping rules.

A stopping rule may refer to a rule (or a portion of a complex rule) used to determine at least in part whether to finalize an approximation of a segment, to stop or wrap up a particular computation or operation, to move on to a different computation or operation, etc., in the approximation of the target LUT. In some embodiments, the stopping rules may contain not only a thresholding detector, but also may contain a rising edge detector, a min/max segment length detector, etc. Stopping rules (e.g., a particular combination of stopping rules, etc.) may be used to produce a better fitting accuracy in finalizing approximating a segment than simply using a thresholding detector based on an overall error threshold.

In various embodiments, different stopping rules may be adopted based on image types, reshaping function types, etc. For example, for reshaping functions represented by curves difficult to be approximated by polynomials, a relatively relaxing stopping rule may be adopted. For relatively smooth images, a relatively stringent stopping rule may be adopted. In some embodiments, a stopping rule may be equivalent to a reduction in degrees of freedom in the approximation operations. The more degrees of freedom (e.g., one degree of freedom, two degrees of freedom, etc.) a stopping rule represents, the more distortion an approximation of a target LUT generated based in part on the stopping rule may generate. The approximation error may be minimized if no stopping rule or a relatively relaxing stopping rule is used. However, the approximation may comprise curve segments that do not meet at their ends, and may or may not be appropriate for specific image types (e.g., relatively smooth images, relatively unsmooth images, etc.).

In an example implementation, Rule No. 1 is defined as follows:

$$(\text{prev\_error\_condition \&\& curr\_error\_condition}) \\ ||\text{max\_custom\_length\_condition} \quad (7)$$

where x && y denotes a Boolean logical "and" of x and y, x||y denotes a Boolean logical "or" of x and y, prev_error_condition represents a predicate indicating whether the last fitting error is less than an applicable error threshold (e.g., a default error threshold t, an adjusted error threshold 0.75t, a further adjusted threshold, etc.); curr_error_condition represents a predicate indicating whether the current fitting error is less than the applicable error threshold; and max_custom_length_condition represents a predicate indicating whether a segment has reached a predefined maximum length.

In an example implementation, Rule No. 2 is defined as follows:

$$(\text{curr\_error\_condition \&\& min\_custom\_length\_condition})||\text{max\_custom\_length\_condition} \quad (8)$$

where min_custom_length_condition is a predicate indicating whether a segment has reached a predefined minimum length.

In an example implementation, Rule No. 3 is defined as follows:

$$\text{curr\_error\_condition \&\& min\_custom\_length\_condition} \quad (9)$$

In some embodiments, the forward search and backward search may use the same set of stopping rules. In some other embodiments, the forward search and backward search may use different sets of stopping rules. In some embodiments, as illustrated in block 206 of FIG. 2, when the continuity condition is NOT enforced, Rule No. 1 is selected for both the forward search and the backward search. In some embodiments, as illustrated in block 208 of FIG. 2, when the continuity condition is enforced, Rule No. 1 is selected for the forward search, whereas Rule No. 2 is selected for the backward search.

In block 210, the LUT approximation module performs the approximation of the target LUT with a forward search algorithm. Results of the approximation of the target LUT with the forward search algorithm may be saved in memory in block 212.

In block 214, the LUT approximation module performs the approximation of the target LUT with a backward search algorithm.

In some embodiments, the approximation of a target LUT in the forward search algorithm or in the backward search algorithm comprises the following steps. After an initial error threshold t is set for one or more algorithms, $2^{nd}$ order polynomials are fit to segments of a reshaping function or an inverse thereof as represented by the target LUT. The fitting of the $2^{nd}$ order polynomials to the segments can be performed one segment by one segment, for example from left to right in the forward search algorithm or from right to left in the backward search algorithm. Each segment may be determined or chosen such that the fitting error between that segment and a corresponding approximating polynomial does not exceed the error threshold t. If the number of segments equals to a maximum number set for the number of $2^{nd}$ order polynomials, then curve fitting successfully reaches the end. On the other hand, if the number of segments is less than the maximum number set for the number of $2^{nd}$ order polynomials, then the error threshold t (e.g., t=0.75t, etc.) is reduced; the foregoing steps are repeated for the reduced error threshold until the number of segments equals to the maximum number set for the number of $2^{nd}$ order polynomials.

In block 216, the LUT approximation module determines whether the approximation of the target LUT with the backward search algorithm generates larger error than the approximation of the target LUT with the forward search algorithm.

In response to determining that the approximation of the target LUT with the backward search algorithm generates larger error than the approximation of the target LUT with the forward search algorithm, in block 218, the LUT approximation module chooses the approximation of the target LUT with the forward search algorithm as the (e.g., final, etc.) approximation of the target LUT.

In response to determining that the approximation of the target LUT with the backward search algorithm does not generate larger error than the approximation of the target LUT with the forward search algorithm, in block 220, the LUT approximation module chooses the approximation of the target LUT with the backward search algorithm as the (e.g., final, etc.) approximation of the target LUT.

In block 222, the LUT approximation module ends operations to approximate the target LUT.

It has been described that an approximation of a target LUT that represents, or is generated based on, an arbitrary reshaping function may be performed with a forward search followed by a backward search. This is for illustration purposes only. In various embodiments, an approximation of a target LUT that represents, or is generated based on, an arbitrary reshaping function may be performed with one search, such as a forward search but not with a backward search, a backward search but not with a forward search. Additionally, optionally, or alternatively, an approximation of a target LUT that represents, or is generated based on, an arbitrary reshaping function may be performed with a backward search followed by a forward search. Thus, these and other variations of approximating a target LUT that represents, or is generated based on, an arbitrary reshaping function may be used under techniques as described herein.

Figure 3A:
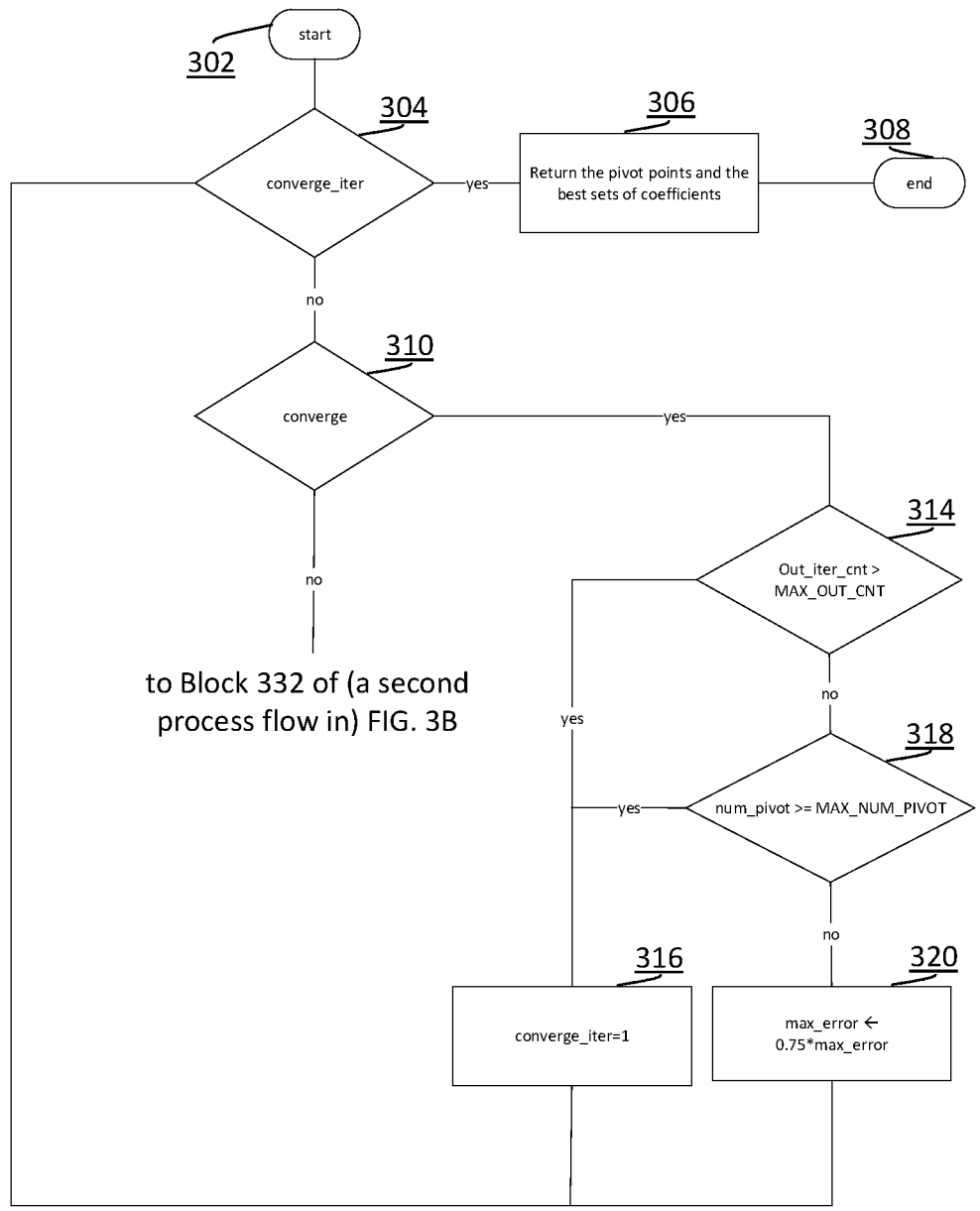
FIG. 3A and FIG. 3B illustrate example process flows for approximating a target LUT.

FIG. 3A illustrates an example process flow for approximating a target LUT. One or more computing devices, one or more modules at least partly implemented in hardware in a computing device, etc., may perform this method. For example, an LUT approximation module in a video processing device such as an adaptive reshaping module in a video encoder, an inverse mapping module in a video decoder, etc., may perform some or all of the process flow of FIG. 3A.

In block 302, the process flow starts by initializing one or more of pivot related variables, processing flags, convergence related variables such as a maximum number (e.g., 20, 30, 40, 50, 60, etc.) of iterations in an outer loop, a search error upper bound (e.g., initialized to the maximum error threshold t, etc.), a flag (denoted as "found_CC") to indicate whether a valid approximation is found in an iteration (e.g., initialized to false, etc.), etc. The maximum number of iterations, the search error upper bound t, etc., are convergence constraints aiming at minimizing distortions in approximating a reshaping function, and may take up different values (e.g., system configurable, user overridable, tunable based on statistics collected with a training set of images, etc.) in various embodiments. In some embodiments, the larger the maximum number of iterations is, the more the process flow will try to minimize distortion in the approximation of the reshaping function. In some embodiments, the search error upper bound t provides a ceiling for distortion where the approximation of the reshaping function is converged (e.g., with iterations at or below the maximum number of iterations, etc.).

In block 304, the process flow enters the outer loop with a convergence flag "converge_iter" that was initialized to false (0) in block 302. More specifically, in block 304, it is determined whether the convergence flag "converge_iter" is set to true (1).

In response to determining that the convergence flag "converge_iter" is set to true, in block 306, the process flow returns pivot point, the best sets of coefficients for the polynomials that approximate the target LUT. In block 308, the process flow ends.

In response to determining that the convergence flag "converge_iter" is set to false, the process flow resets one or more of inner-loop parameters such as an inner loop flag "converge" to false, the flag "found_CC" to false, a variable "num_pivot" (e.g., indicating the current number of pivots, etc.) to one (1), etc., and enters an inner loop with the inner loop flag "converge" reset to false (0). More specifically, in block 310, the process flow determines whether the inner loop flag "converge" is set to true (1).

Figure 3B:
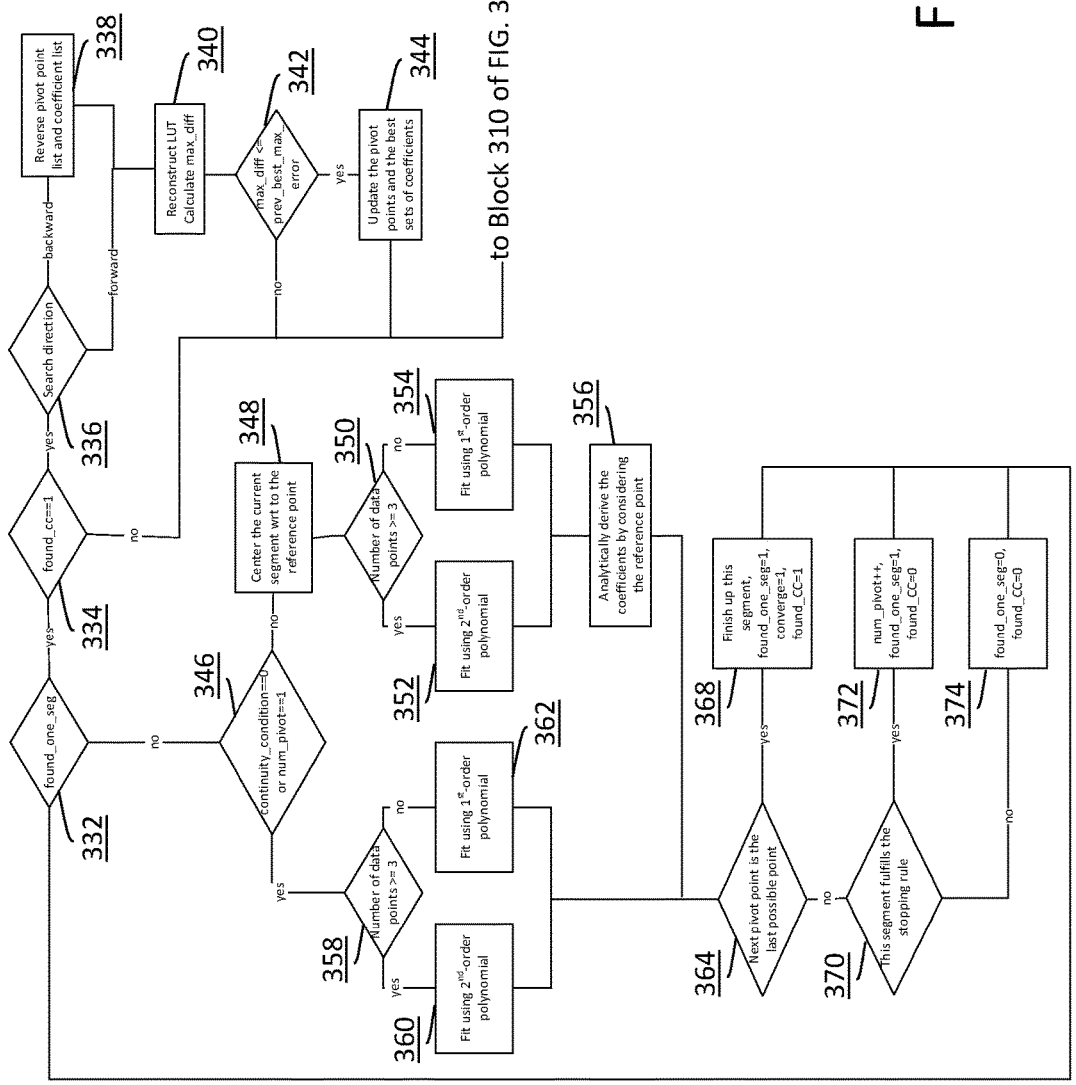

In response to determining that the inner loop flag "converge" is set to false, the process flow initializes a processing flag "found_one_seg" to false (0), initializes an inner loop iteration count "iter_cnt" to one (1), and proceeds to perform a second process flow for adding a new segment that is approximated by a polynomial, and goes to block 332 of the second process flow illustrated in FIG. 3B. The second process flow is repeated until the inner loop flag "converge" is determined to be true in block 310.

In response to determining that the inner loop flag "converge" is set to true, in block 314, the process flow determines whether the number of iterations in the outer loop, as indicated by an outer loop iteration counter "Out_iter_cnt", exceeds a maximum number of iterations in the outer loop, as indicated by a (e.g., constant, etc.) configured value "MAX_OUT_CNT".

In response to determining that the number of iterations in the outer loop exceeds the maximum number of iterations in the outer loop, in block 316, the convergence flag "converge_iter" is set to true (1), and the process flow goes to block 304.

In response to determining that the number of iterations in the outer loop does not exceed the maximum number of iterations in the outer loop, in block 318, the process flow determines whether the (e.g., current, etc.) number of pivots, as indicated by the variable "num_pivot", exceeds a maximum number of pivots (e.g., a maximum of nine pivots if the maximum number of polynomials is eight, a maximum of ten pivots if the maximum number of polynomials is nine, etc.) as indicated by a (e.g., constant, etc.) configured value "MAX_NUM_PIVOT".

In response to determining that the number of pivots does not exceed the maximum number of pivots, in block 320, the search error upper bound, denoted as "max_error", is reduced (e.g., max_error=0.75 max_error, etc.), and the process flow goes to block 304.

In response to determining that the number of pivots exceeds the maximum number of pivots, in block 316, the convergence flag "converge_iter" is set to true (1), and the process flow goes to block 304.

FIG. 3B illustrates an example second process flow that may be invoked in block 310 of FIG. 3A in response to determining that the convergence flag "convergence" is false. One or more computing devices, one or more modules at least partly implemented in hardware in a computing device, etc., may perform this method. For example, an LUT approximation module in a video processing device such as an adaptive reshaping module in a video encoder, an inverse mapping module in a video decoder, etc., may perform some or all of the process flow of FIG. 3B.

In block 332, the second process flow determines whether the processing flag "found_one_seg" is set to true (1). In response to determining that the processing flag "found_one_seg" is set to false, the second process flow sets the lower bound and upper bound for a segment candidate, and then goes to block 346.

In some embodiments, the setting of the lower bound and upper bound for a segment candidate includes setting the horizontal distance between the lower bound and upper bound for the segment candidate to be the current value of the inner loop iteration count "iter_cnt". As a result, in multiple inner loop iteration scenarios, so long as the flag "found_one_seg" remains to be false (0), the segment candidate grows in length as the inner loop iteration count "iter_cnt" increments from one inner iteration to the next.

On the other hand, in response to determining that the processing flag "found_one_seg" is set to true, the second process flow goes to block 334. However, before going to block 334 from block 332, the second process flow first determines whether the number of pivots as indicated by the variable "num_pivot" exceeds the maximum number of pivots represented by the configured value "MAX_NUM_PIVOT". In response to determining that the number of pivots exceeds the maximum number of pivots, the flag "found_CC" is set to false (0), and the inner loop flag "converge" is set to true (1).

In block 334, the second process flow proceeds to determine whether the flag "found_CC" is set to true (1). In response to determining that the flag "found_CC" is set to false (0), the second process flow returns to block 310 in the process flow of FIG. 3A. On the other hand, in response to determining that the flag "found_CC" is set to true (1), in block 336, the second process flow determines whether a search direction value indicates a forward search or a backward search. In response to determining that the search direction value indicates a backward search, in block 338, the second process flow reorders or reverses entries in a generated pivot point list, entries in a coefficient list, etc., and then goes to block 340. In response to determining that the search direction value indicates a forward search, the second process flow directly goes to block 340 without reordering or reversing the entries in the generated pivot point list, the entries in the coefficient list, etc.

In block 340, the second process flow reconstructs a generated LUT based on polynomials as defined with the entries in the generated pivot point list, the entries in the coefficient list, etc., and computes a maximum error "max_diff" between the target LUT and the generated LUT. In block 342, the second process flow determines whether the maximum error "max_diff" is no more than a previous best maximum error "prev_best_max_error".

In response to determining that the maximum error "max_diff" is no more than a previous best maximum error "prev_best_max_error", the entries in the generated pivot point list, the entries in the generated coefficient list, etc., are saved as current best pivot points, current best coefficients, etc., and the second process flow goes to block 310 in the process flow of FIG. 3A.

In response to determining that the maximum error "max_diff" is more than a previous best maximum error "prev_best_max_error", the entries in the generated pivot point list, the entries in the generated coefficient list, etc., are not saved as current best pivot points, current best coefficients, etc., and the second process flow goes to block 310 in the process flow of FIG. 3A.

In block 346, the second process flow determines whether a continuity condition flag "continuity_condition" is set to false (0) or the variable "num_pivot" is one (1). When the flag "continuity_condition" is set to false, the continuity condition or continuity constraint as previously discussed is not enforced. When the flag "continuity_condition" is set to true (1), the continuity condition or continuity constraint as previously discussed is enforced.

In response to determining that the continuity condition is enforced and the variable "num_pivot" is not one, the second process flow goes to block 348. In some embodiments, the variable "num_pivot" was initialized to one (1) before the process flow of FIG. 3A enters the inner loop represented by block 310 from block 304, and thereafter in the inner loop is incremented by one each time a new (e.g., valid, etc.) segment approximated by a polynomial is determined or selected. Thus, when the variable "num_pivot" is not one, the second process flow in block 346 is dealing with an iteration in which at least one segment approximated by at least one polynomial has been determined/selected.

In some embodiments, a LUT such as a target LUT, a non-target LUT, etc., that maps input codeword values (e.g., as keys in key-value pairs of the LUT, etc.) to mapped code values (e.g., as values in the key-value pairs of the LUT, etc.) may be represented in a coordinate system (e.g., a Cartesian coordinate system, etc.) in which the horizontal axis represents the input codeword values and the vertical axis represents the mapped codeword values. The last polynomial used in approximating the last segment of the target LUT may be used to compute a mapped codeword value based on an input code value in a next entry in the target LUT (e.g., a next data point following the last segment in the coordinate system, etc.). A combination of the input code value in the next entry and its corresponding computed mapped codeword value with the last polynomial may be used as a reference (pivot) point for the segment candidate for the purpose of enforcing the continuity condition or constraint.

In block 348, the second process flow centers a current segment (e.g., the segment candidate, etc.) with respect to the reference (pivot) point as generated at least in part from the last polynomial approximating the last segment. Centering the segment candidate in block 348 may be accomplished by transforming (e.g., translating, etc.) the coordinate system into a new coordinate system in which one or both of the new horizontal and vertical coordinate values of the reference point is zero. In block 350, the second process flow determines whether the number of data points in the segment candidate is no less than three (3). In response to determining that the number of data points in the segment candidate is no less than three (3), in block 352, the second process flow generates a $2^{nd}$ order polynomial to approximate the segment candidate based on the data points in the segment candidate from the target LUT. In response to determining that the number of data points in the segment candidate is less than three (3), in block 354, the second process flow generates a $1^{st}$ order polynomial to approximate the segment candidate based on the data points in the segment candidate from the target LUT. In block 356, the second process flow analytically derive coefficients of a current polynomial (e.g., in the coordinate system before it is transformed into the new coordinate system, etc.) to approximate the segment candidate from either the $1^{st}$ or $2^{nd}$ order polynomial (e.g., derived with the new coordinate system, etc.) by inversely transforming the new coordinate system back to the coordinate system.

In block 346, in response to determining that either the continuity condition is not enforced in approximating the target LUT or the variable "num_pivot" is one, the second process flow goes to block 358. The second process flow performs similar operations in blocks 358, 360 and 362 as those in blocks 350, 352 and 354.

As shown in FIG. 3B, the second process flow goes to block 364 from one of blocks 356, 360, or 362. In block 364, the second process flow determines whether the upper bound of the current segment, denoted as "next pivot point," is the last possible (data) point or entry in the target LUT. In response to determining that the upper bound of the current segment is the last possible (data) point or entry in the target LUT, the second process flow finishes up the current segment, sets the flag "found_one_seg" to true (1), the flag "converge" to true (1), the flag found_CC to false (0), etc., and goes to block 332.

In response to determining that the upper bound of the current segment is not the last possible (data) point or entry in the target LUT, the second process flow determines whether the current segment (or the segment candidate) fulfills the stopping rule (e.g., zero, one or more of Rule 1, Rule 2, Rule 3, etc.) set for the approximation operations. In response to determining that the current segment (or the segment candidate) fulfills the stopping rule, in block 372, the second process flow increments the variable "num_pivot" by one, sets the flag "found_one_seg" to true (1), the flag "found_CC" to false (0), etc., and goes to block 332. On the other hand, in response to determining that the current segment (or the segment candidate) does not fulfill the stopping rule, in block 372, the second process flow sets the flag "found_one_seg" to false (0), the flag "found_CC" to false (0), and goes to block 332.

Before the second process flow goes to block 332 from any of blocks 368, 372, and 374, the inner loop iteration count "iter_cnt" is incremented by one. When the flag "found_one_seg" remains to be false as in the case of block 374, the length of the segment candidate for the next iteration will increment as the inner loop iteration count "iter_cnt" will be incremented in the beginning of the next iteration. The longer segment candidate will be approximated in the next iteration by a polynomial in blocks 352, 354, 360, or 362 as discussed above.

Adaptive reshaping under techniques as described herein can be performed with one or more of a variety of reshaping functions or inverses thereof, LUTs representing analytical or non-analytical functions, etc. In the case of using power functions as reshaping functions or inverses thereof, the techniques can be used to specifically select adaptive reshaping parameters such as exponent values for the power functions, etc., to enhance perceptual quality.

In some embodiments, video content such as source video content, intermediate video content, output video content, etc., may be encoded in a non-linear color space such as a perceptually quantized (PQ) color space, etc. The PQ color space may comprise a set of available PQ codewords for encoding video content. Different PQ codewords in the PQ color space may not be linearly scaled with luminance values, but rather may correspond to varying quantization steps in luminance values. For example, the PQ color space may allocate more codewords in dark luminance value regions and fewer codewords in the bright luminance value regions. Some examples of PQ color spaces, transforms, mappings, transfer functions, etc., are described in SMPTE ST 2084:2014 "High Dynamic Range EOTF of Mastering Reference Displays," which is incorporated herein by reference in its entirety.

Techniques as described herein can be used to adaptively shape input video content (e.g., source video content, PQ encoded video content, video content with a relatively large set of available codewords, etc.) reshaped video content encoded with a reshaping function (e.g., a forward power function, etc.) comprising a relatively limited set of reshaped codewords, which then can be carried in a relatively low bit depth video signal.

A relatively limited set of reshaped codewords as described herein may allocate more codewords in high luminance value regions for relatively smooth bright images, relatively smooth bright scenes, etc., such as images comprising large areas of bright visual features (e.g., sky, windows, polished metal, airplanes, cars, etc.). The allocation of more codewords in the high luminance value regions in the reshaping function reduces or prevents visual artifacts such as color banding, etc., in those images, scenes, etc. In some embodiments, relatively large exponent values may be selected for (e.g., forward, etc.) reshaping functions represented by forward power functions. A relatively large exponent value (e.g., 1.6, 1.7, a relatively large value at which banding artifacts are eliminated, etc.) to a forward power function provides relatively more codewords for reshaping video content portions representing bright areas. Conversely, inverses (e.g., backward power functions, etc.) of (e.g., forward, etc.) reshaping functions may use relatively small exponent values that are inverses of the exponent values in forward power functions, for the purpose of reconstructing a version of pre-reshaped video content based on a received adaptively shaped video signal shaped with the forward power functions with relatively large exponent values.

A relatively limited set of reshaped codewords as described herein may allocate more codewords in low luminance value regions for relatively dark images, relatively dark scenes, etc., such as images comprising large dark visual features (e.g., shadows, starry sky, night, low light indoor, etc.). The allocation of more codewords in the low luminance value regions in the reshaping function helps preserve image details or features in those images, scenes, etc. In some embodiments, relatively small exponent values may be selected for (e.g., forward, etc.) reshaping functions represented by forward power functions. A relatively small exponent value (e.g., 1.0, a relatively small value at which dark image details are preserved, etc.) to a forward power function provides relatively more codewords for reshaping video content portions representing dark areas. Conversely, inverses (e.g., backward power functions, etc.) of (e.g., forward, etc.) reshaping functions may use relatively large exponent values that are inverses of the exponent values in forward power functions, for the purpose of reconstructing a version of pre-reshaped video content based on a received adaptively shaped video signal shaped with the forward power functions with relatively small exponent values.

For other images, scenes, etc., depicting most objects or features in the mid-tone, reshaped codewords may be distributed more uniformly in terms of luminance values. For example, a forward power function may use an exponent value of 1.3, 1.4, etc.

It should be noted that exponent values as mentioned are for illustration purposes only. Where power functions are used in at least a part of a reshaping function, these and other exponent values may be adopted based on a variety of factors including but not limited to image types, etc. Additionally, optionally, or alternatively, functions, relationships, etc., other than power functions can be used in at least a part of a reshaping function. For these other functions, exponent values as mentioned and other exponent values may be adopted.

One or more of a variety of image processing algorithms may be implemented under techniques as described herein to determine whether an image, scene, etc., has potential bright areas prone to generate contouring/banding artifacts in a reconstructed version of the image, scene, etc. In some embodiments, each image in the image, scene, etc., may be divided into multiple non-overlapping N×N block (comprising N×N pixels, where N is a positive integer such as 2, 4, 6, 8, 16, etc.). In each of some or all of the blocks, minimum, maximum, mean, etc., values within the block may be computed/determined. FIG. 4A illustrates an example algorithm for determining whether such an image (or frame), scene, etc., comprises smooth bright areas. A difference between the maximum and minimum values in a block can be computed and compared with a difference threshold (denoted as $T_e$). If the difference is smaller than the threshold ($T_e$), the block may be classified as a smooth block potentially prone to banding artifacts. Additionally, optionally, or alternatively, to quantify or identify bright areas, the mean value of the block may be compared with a mean value threshold (denoted as $T_b$). If the mean value exceeds the threshold ($T_b$), the block may be classified as a bright block. The number of smooth bright blocks in an image, scene, etc., can be determined based on the foregoing analysis of the image, scene, etc. If the number of smooth bright blocks in an image constitutes over a certain percentage (denoted as $P_b$) of the total number of blocks, then the image (or image frame) may be considered as an image with smooth bright areas.

One or more of a variety of image processing algorithms may be implemented under techniques as described herein to determine whether an image (or frame), scene, etc., has relatively large dark areas. FIG. 4B illustrates an example of such an algorithm. In some embodiments, the total number of dark pixels—among some or all pixels in an image, scene, etc.—that have luminance values smaller than a luminance threshold (denoted as $T_d$) is determined. If the total number of dark pixels is over a percentage threshold (denoted as $P_d$), the image, scene, etc., is classified as containing large dark areas.

FIG. 4C illustrates another example for determining whether an image (or frame), scene, etc., has relatively large dark areas. A difference between the maximum and minimum values in a block can be computed. If the difference is 0, or alternatively in some embodiments smaller than a small difference threshold, the block may be classified as pure black block and ignored. On the other hand, if the difference is non-zero, or alternatively in some embodiments no smaller than a small difference threshold, the block is classified as a non-pure black block. The mean value of the block may be compared with a second mean value threshold (denoted as $T_s$). Additionally, optionally, or alternatively, a standard deviation value in the block may also be computed and compared with a standard deviation threshold (denoted as $T_{std}$). If the mean value is less than the second mean value threshold ($T_s$) and the standard deviation value is less than the standard deviation threshold ($T_{std}$), the block may be classified as a smooth dark block. A smooth dark area can then be identified as an area comprising at least a certain number (e.g., eight, ten, sixteen, a different positive integer number greater than two, etc.) of smooth dark blocks that are connected between or among the certain number of smooth dark blocks. The largest smooth dark area in an image can be determined among zero, one or more smooth dark areas identified from the image. If the number of dark smooth blocks in the largest smooth dark area in the image can constitutes over a certain percentage (denoted as $P_{bd}$) of the total number of blocks, then the image (or image frame) may be considered as an image with smooth dark areas.

In some embodiments, a codec as described herein may precompute a plurality of candidate LUTs based on different candidate sets of adaptive reshaping parameters. For example, in embodiments in which reshaping functions are based on power functions, each candidate set of adaptive reshaping parameters may include an upper bound of a dynamic range supported by a source video signal, a lower bound of the dynamic range supported by the source video signal, an exponent value, etc.; a corresponding candidate LUT may be precomputed based at least in part on that candidate set of adaptive reshaping parameters. Likewise, a candidate LUT that represents an inverse of a candidate reshaping function may be precomputed based on a candidate set of adaptive reshaping parameters. Additionally, optionally, or alternatively, one or more candidate sets of polynomials along with one or more candidate sets of corresponding candidate polynomial coefficients, pivots, etc., may be precomputed to approximate one or more target LUTs that may represent a reshaping function and an inverse thereof. Some or all of the foregoing as precomputed may be saved in memory. For example, candidate alpha values to be computed may include, but not limited to only, any OF: 0.5, 0.6, 0.7, 0.8, 0.9, 1.0, 1.1, 1.2, 1.3, 1.4, 1.5, 1.6, 1.7, 1.8, 1.9, ETC. NOTE THAT AN ALPHA value of 1.0 may not need a LUT, as a reshaping function in that case is a linear function. In some embodiments, the candidate LUTs may include LUTs with different quantization steps (e.g., represented by pairs of neighboring codeword values, etc.). At runtime when an image is being reshaped in an encoder or inversely mapped in a decoder, based on statistics computed based on actual content of the image, a candidate LUT (or candidate polynomials with candidate polynomial coefficients, pivots, etc.) may be selected among a plurality of LUTs as the LUT (or the polynomials with the polynomial coefficients, pivots, etc.) for the purpose of applying adaptive reshaping or corresponding inverse mapping.

In some embodiments, some or all of polynomial coefficients, pivots, etc., under techniques as described herein may be expressed in a certain number of bytes such as four bytes (e.g., 1 byte for integer and 3 bytes for fractional point, etc.).

The LUT (or the polynomials with the polynomial coefficients, pivots, etc.) may be adaptively determined from image to image, from scene to scene, etc.

6. Example Process Flows

Figure 5A:
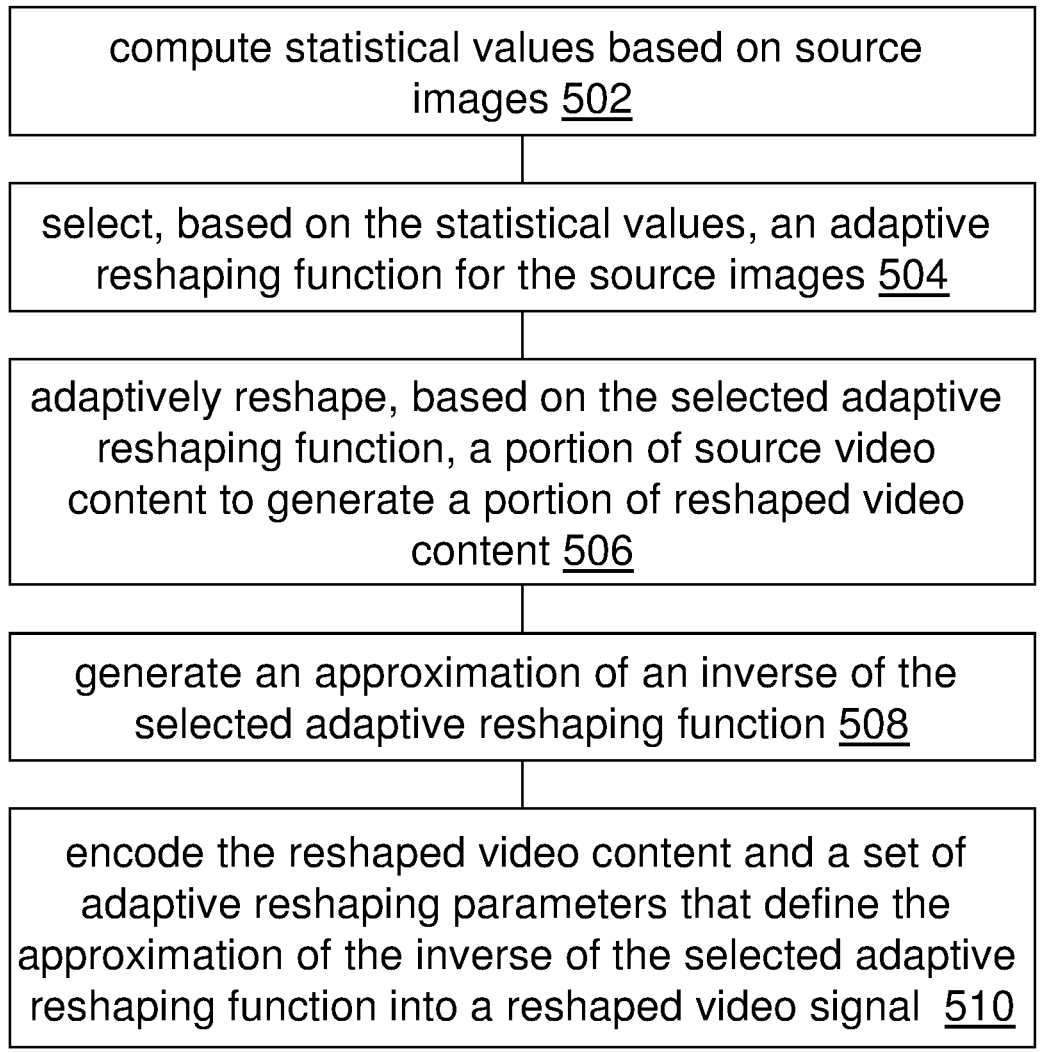
FIG. 5A and FIG. 5B illustrate example process flows for adaptively reshaping and inverse mapping.

FIG. 5A illustrates an example process flow. In some embodiments, one or more computing devices or components may perform this process flow. In block 502, a video encoder (e.g., 102 of FIG. 1A) receives a sequence of source images; the video encoder (102) computes one or more statistical values based on one or more source images in a sequence of source images.

In block 504, the video encoder (102) selects, based on the one or more statistical values, an adaptive reshaping function for the one or more source images.

In block 506, the video encoder (102) adaptively reshapes, based at least in part on the selected adaptive reshaping function, a portion of source video content to generate a portion of reshaped video content, the portion of source video content being represented by the one or more source images.

In block 508, the video encoder (102) generates an approximation of an inverse of the selected adaptive reshaping function.

In block 510, the video encoder (102) encodes the reshaped video content and a set of adaptive reshaping parameters that define the approximation of the inverse of the selected adaptive reshaping function into a reshaped video signal.

In an embodiment, the portion of the reshaped video content comprises one or more reshaped images.

In an embodiment, the one or more source images form a scene.

In an embodiment, the one or more statistic values include at least one of a maximum value, a minimum value, a mean value, a median value, an average value, a standard deviation value, etc., as determined based on source codewords in the one or more source images.

In an embodiment, at least one of the selected adaptive reshaping function or the inverse of the selected adaptive reshaping function comprises one or more of analytical functions, non-analytical functions, lookup tables (LUTs), sigmoid functions, power functions, piecewise functions, etc.

In an embodiment, the approximation of the inverse of the selected adaptive reshaping function is represented by a set of polynomials.

In an embodiment, a total number of polynomials in the set of polynomials is limited below a number threshold.

In an embodiment, coefficients for polynomials in the set of polynomials are determined based on minimizing differences between values given by the polynomials and values given in a target lookup table (LUT) that represents the inverse of the selected adaptive reshaping function.

In an embodiment, the video encoder (102) is further configured to select a continuity condition for generating the set of polynomials based on a type of function determined for the inverse of the selected adaptive reshaping function.

In an embodiment, the set of polynomials are pre-determined before the one or more source images are being processed for adaptive reshaping.

In an embodiment, the set of polynomials are dynamically determined while the one or more source images are being processed for adaptive reshaping.

In an embodiment, the video encoder (102) is further configured to classify the one or more source images as one of images comprising smooth bright areas, images comprising smooth dark areas, or mid-tone images.

In an embodiment, the portion of source video content is adaptively reshaped into the portion of reshaped video content for one or more channels in a plurality of channels of a color space.

In an embodiment, the one or more channels include a luminance related channel.

In an embodiment, the reshaped video signal is one of a dual channel 8-bit video signal or a single channel 10-bit video signal.

In an embodiment, the reshaped video signal is generated by at least one of: an advanced video coding (AVC) encoder, a Moving Picture Experts Group (MPEG)-2 encoder, or a High Efficiency Video Coding (HEVC) encoder.

In an embodiment, the sequence of source images is perceptually encoded.

In an embodiment, the portion of source video content is adaptively reshaped into the portion of reshaped video content without using any approximation of the selected adaptive reshaping function.

Figure 5B:
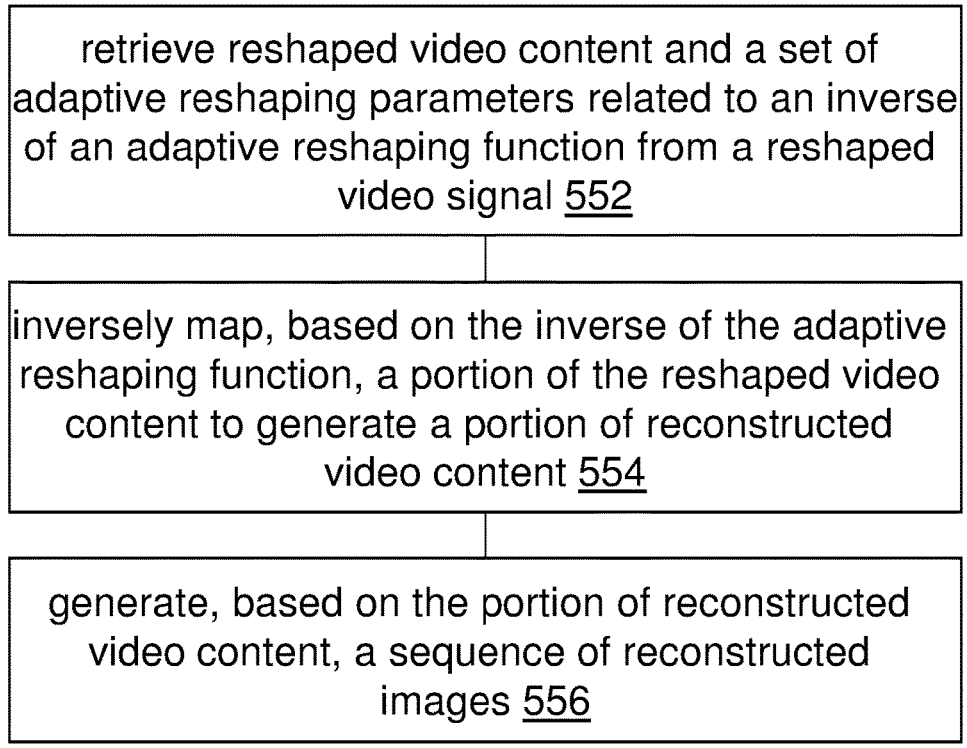

FIG. 5B illustrates an example process flow. In some embodiments, one or more computing devices or components may perform this process flow. In block 552, a video decoder (e.g., 152 of FIG. 1A) retrieve reshaped video content and a set of adaptive reshaping parameters related to an inverse of an adaptive reshaping function from a reshaped video signal, the reshaped video content being generated by an upstream device based at least in part on the adaptive reshaping function.

In block 504, the video decoder (152) inversely maps, based at least in part on the inverse of the adaptive reshaping function, a portion of the reshaped video content to generate a portion of reconstructed video content.

In block 506, the video decoder (152) generates, based at least in part on the portion of reconstructed video content, a sequence of reconstructed images, the sequence of reconstructed images representing a reconstructed version of a sequence of source images used by the upstream device to generate the reshaped video content.

In an embodiment, the video decoder (152) is further configured to render the plurality of reconstructed images in a display system.

In an embodiment, the video decoder (152) is further configured to perform: establishing, based at least in part on the set of adaptive reshaping parameters related to an inverse of an adaptive reshaping function from a reshaped video signal, an approximation of a target lookup table (LUT) that represents the inverse of the adaptive reshaping function; etc.

In various example embodiments, an encoder, a decoder, a transcoder, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

7. Real-Time Optimizations

As discussed earlier, the method to generate a piecewise approximation of a reshaping function using 2nd-order polynomials may be summarized as follows: Given a starting point, a search is performed to identify a segment along the reshaping curve. If a set of termination conditions are met, then it sets a pivot point, and initiates a new search until the whole curve has been segmented. This process can be sub-divided as follows: (1) compute polynomial coefficients for each segment for candidate pivot points, (2) determine an approximation error for each candidate, and (3) if the approximation error is smaller than a target threshold, then declare the segment as valid and set the end pivot point for that segment. (4) When all segments have been identified, the process may be repeated using a smaller target threshold to improve the accuracy of the approximation polynomials.

From a computational point of view, step (1) is the most time consuming, followed by step (4). As appreciated by the inventors, some embodiments may require a real-time implementation even at the expense of potentially reduced accuracy. In this section, a variety of improvements are presented for such real-time implementations. The improvements can be divided in two classes: a) A faster method to compute the polynomial coefficients within each segment, without losing any accuracy, and b) a faster method to converge, that is to reduce the overall number of iterations required to identify the best (according to some criterion) approximation segments.

Fast Polynomial Solution without Continuity Constraint

Consider, without loss of generality, the p-th segment of a curve approximated by a second order polynomial $$\hat{v}_{p,i} = m_{p,0} + m_{p,1} \cdot s_{p,i} + m_{p,2} \cdot (s_{p,i})^2, \quad (10)$$

where $s_{p,i}$ denotes the i-th reshaped pixel value of standard (or lower) dynamic range (SDR or LDR) corresponding to the p-th polynomial segment. Let $v_i$ be the corresponding, co-located, original high dynamic range (HDR) pixel value. Let $\hat{v}_{p,i}$ be the corresponding, co-located, predicted HDR pixel. Let the p-th segment of the polynomial have a range of SDR values from $S_{p,L}$ (L) to $S_{p,H}$ (H), where L is the low pivot index and H is the high pivot index in the current p-th segment (for simplicity, the p index is dropped from L and H). In an embodiment, the parameters ($m_{p,j}$, for j=0, 1, and 2) of the polynomial in equation (10) may be computed using a least-square solution as follows.

Equation (10) may be rewritten in a vector-matrix form, as:

$$\begin{bmatrix} \hat{v}_{p,L} \\ \hat{v}_{p,L+1} \\ \hat{v}_{p,L+2} \\ \vdots \\ \hat{v}_{p,H} \end{bmatrix} = \begin{bmatrix} 1 & s_{p,L} & s_{p,L}^2 \\ 1 & s_{p,L+1} & s_{p,L+1}^2 \\ 1 & s_{p,L+2} & s_{p,L+2}^2 \\ \vdots & \vdots & \vdots \\ 1 & s_{p,H} & s_{p,H}^2 \end{bmatrix} \begin{bmatrix} m_{p0} \\ m_{p1} \\ m_{p2} \end{bmatrix}, \quad (11)$$

or $$\hat{v}_p = S_p m_p,$$

with a least squares solution given by $$m_p = ((S_p)^T(S_p))^{-1}((S_p)^T v_p), \text{ where}$$

$$v_p = \begin{bmatrix} v_{p,L} \\ v_{p,L+1} \\ v_{p,L+2} \\ \vdots \\ v_{p,H} \end{bmatrix}$$

denotes a vector of the original HDR pixels. To facilitate the discussion, a $B_p$ matrix and a vector $a_p$ are also defined as:

$$B_p = (S_p)^T(S_p), \tag{12}$$

and $$a_p = (S_p)^T v_p, \tag{13}$$

where $$B_p = \begin{bmatrix} b_{p,00} & b_{p,01} & b_{p,02} \\ b_{p,10} & b_{p,11} & b_{p,12} \\ b_{p,20} & b_{p,21} & b_{p,22} \end{bmatrix}$$

$$= (S_p)^T(S_p)$$

$$= \begin{bmatrix} 1 & 1 & 1 & \cdots & 1 \\ s_{p,L} & s_{p,L+1} & s_{p,L+2} & \cdots & s_{p,H} \\ s_{p,L}^2 & s_{p,L+1}^2 & s_{p,L+2}^2 & \cdots & s_{p,H}^2 \end{bmatrix} \begin{bmatrix} 1 & s_{p,L} & s_{p,L}^2 \\ 1 & s_{p,L+1} & s_{p,L+1}^2 \\ 1 & s_{p,L+2} & s_{p,L+2}^2 \\ \vdots & \vdots & \vdots \\ 1 & s_{p,H} & s_{p,H}^2 \end{bmatrix}.$$

For the $B_p$ matrix, each of its elements can be computed as:

$$b_{p,00} = \sum_{i=L}^{H} 1 \tag{14}$$

$$b_{p,01} = b_{p,10} = \sum_{i=L}^{H} s_{p,i}$$

$$b_{p,20} = b_{p,11} = b_{p,02} = \sum_{i=L}^{H} (s_{p,i})^2$$

$$b_{p,21} = b_{p,12} = \sum_{i=L}^{H} (s_{p,i})^3$$

$$b_{p,22} = \sum_{i=L}^{H} (s_{p,i})^4.$$

For the $a_p$ vector, given $$a_p = \begin{bmatrix} a_{p,0} \\ a_{p,1} \\ a_{p,2} \end{bmatrix}$$

$$= (S_p)^T v_p$$

$$= \begin{bmatrix} 1 & 1 & 1 & \cdots & 1 \\ s_{p,L} & s_{p,L+1} & s_{p,L+2} & \cdots & s_{p,H} \\ s_{p,L}^2 & s_{p,L+1}^2 & s_{p,L+2}^2 & \cdots & s_{p,H}^2 \end{bmatrix} \begin{bmatrix} v_{p,L} \\ v_{p,L+1} \\ v_{p,L+2} \\ \vdots \\ v_{j,H} \end{bmatrix},$$

each element can be computed as $$a_{p,0} = \sum_{i=L}^{H} v_{p,i} \tag{15}$$

$$a_{p,1} = \sum_{i=L}^{H} (s_{p,i} v_{p,i}),$$

$$a_{p,2} = \sum_{i=L}^{H} ((s_{p,i})^2 v_{p,i})$$

From equation (14), computing the elements of the $B_p$ matrix requires computing the factors:

$$\sum_{i=L}^{H} s_{p,i}^k, k = 0, 1, 2, 3, 4. \tag{16}$$

However, the $s_{pi}$ values are finite, say within [0,1] if normalized, or within [0, $2^{bit\text{-}depth}1$] if unnormalized, hence, in an embodiment, the computational time to solve equation (11) may be improved by using precomputed look-up tables (LUTs) as follows.

Let β (beta) denote precomputed values of equation (16) as follows:

$$\beta = \begin{bmatrix} 1 & s_0 & s_0^2 & s_0^3 & s_0^4 \\ 1 & s_0+s_1 & s_0^2+s_1^2 & s_0^3+s_1^3 & s_0^4+s_1^4 \\ 1 & s_0+s_1+s_2 & s_0^2+s_1^2+s_2^2 & s_0^3+s_1^3+s_2^3 & s_0^4+s_1^4+s_2^4 \\ \vdots & \vdots & \vdots & \vdots & \vdots \\ 1 & \sum_{i=0}^{Max} s_i & \sum_{i=0}^{Max} s_i^2 & \sum_{i=0}^{Max} s_i^3 & \sum_{i=0}^{Max} s_i^4 \end{bmatrix}, \tag{17}$$

where the indices i, j for β[i,j] range i=[0, Max] and j=[0, 4], and Max denotes the maximum possible pixel value in a specific video sequence.

From the LUT above, for any value p between $s_L$ and $s_H$, the $B_p$ matrix can be computed as $$b_{p,00} = H - L + 1$$

$$b_{p,01} = b_{p,10} = \beta_{H,1} - \beta_{L-1,1}$$

$$b_{p,20} = b_{p,11} = b_{p,02} = \beta_{H,2} - \beta_{L-1,2}$$

$$b_{p,21} = b_{p,12} = \beta_{H,3} - \beta_{L-1,3}$$

$$b_{p,22} = \beta_{H,4} - \beta_{L-1,4} \tag{18}$$

When the lower pivot is 0, one may substitute L=0 in equation (14) and compute the $B_p$ matrix using $$b_{p,0000} = H + 1$$

$$b_{p,01} = b_{p,10} = \beta_{H,1}$$

$b_{p,20} = b_{p,11} = b_{p,02} = \beta_{H,2}$ $b_{p,21} = b_{p,12} = \beta_{H,3}$ $b_{p,22} = \beta_{H,4}$ (19)

Following the same process for the beta LUT, one may also define an alpha ($\beta$) (Max+1)×4 LUT as $$\alpha = \begin{bmatrix} v_0 & s_0 v_0 & s_0^2 v_0 & s_0^3 v_0 \\ v_0 + v_1 & s_0 v_0 + s_1 v_1 & s_0^2 v_0 + s_1^2 v_1 & s_0^3 v_0 + s_1^3 v_1 \\ v_0 + v_1 + v_2 & s_0 v_0 + s_1 v_1 + s_2 v_2 & s_0^2 v_0 + s_1^2 v_1 + s_2^2 v_2 & s_0^3 v_0 + s_1^3 v_1 + s_2^3 v_2 \\ \vdots & \vdots & \vdots & \vdots \\ \sum_{i=0}^{Max} v_i & \sum_{i=0}^{Max} s_i v_i & \sum_{i=0}^{Max} s_i^2 v_i & \sum_{i=0}^{Max} s_i^3 v_i \end{bmatrix}. \quad (20)$$

Then, the elements of the $a_p$ vector may be computed in terms of the alpha LUT as:

$a_{p,0} = \alpha_{H,0} - \alpha_{L-1,0}$ $a_{p,1} = \alpha_{H,1} - \alpha_{L-1,1}$ $a_{p,2} = \alpha_{H,2} - \alpha_{L-1,2}$ (21)

For L=0, equation (21) can be simplified as $a_{p,0} = \alpha_{H,0}$ $a_{p,1} = a_{p,10} = \alpha_{H,1}$ $a_{p,2} = \alpha_{H,2}$. (21b)

In summary, Table 1 shows in pseudo code the steps for a faster computation of the polynomial coefficients:

TABLE 1

Fast solution for polynomial parameters without continuity constraint

1. At the sequence level, create LUT $\beta$
2. At each frame, create LUT $\alpha$
3. For each segment
   a. Calculate the $B_p$ matrix using equations (18) or (19)
   b. Calculate the $a_p$ vector using equations (21) or (21b)
   c. Solve $m_p = (B_p)^{-1} a_p$ Fast Polynomial Solution with Continuity Constraint Under the continuity constraint, the starting point of the p-th polynomial is forced to be connected to the ending point of the p−1-th polynomial, so the connected pieces are continuous. Let $s_{p-1}$ denote the end SDR value for the p−1-th segment. Then, the corresponding HDR predicted value may be computed as:

$\hat{v}_{p-1} = m_{p-1,0} + m_{p-1,1} \cdot s_{p-1} + m_{p-1,2} \cdot (s_{p-1})^2$. (22)

Under the constraint that if $s_{p,i} = s_{p-1}$ there should be a single predicted value, $\hat{v}_{p-1}$, the prediction polynomial can be derived as:

$(\hat{v}_{p,i} - \hat{v}_{p-1}) = mt_{p,1} \cdot (s_{p,i} - s_{p-1}) + mt_{p,2} \cdot (s_{p,i} - s_{p-1})^2$. (23)

which, as before can be expressed as $$\begin{bmatrix} m_{p,1} \\ m_{p,2} \end{bmatrix} = m_p = ((S_p)^T (S_p))^{-1} ((S_p)^T v_p) = B_p^{-1} a_p. \quad (24)$$

Note that during a forward segment search, the p−1-th segment is before the p-th segment, so the end point of the p−1 segment must coincide with the beginning point of the p-th segment; however, during a reverse segment search, the p−1-th segment is after the p-th segment, hence the beginning point of the p−1 segment must coincide with the end point of the p-th segment.

Given equation (24), following a similar approach as before, in an embodiment, one can prove that a solution to this equation may be derived following the steps in Table 2.

TABLE 2

Fast solution for polynomial parameters with continuity constraint

1. At the sequence level, create LUT $\beta$
2. For each frame, at each segment approximation start, create $a = \begin{bmatrix} a_1 \\ a_2 \end{bmatrix} = \begin{bmatrix} 0 \\ 0 \end{bmatrix}$ 3. Forward approximation
   For the current p-th segment, let L denote the known low point
   For i = L, ..., H
     Calculate $B_p$ matrix,
     $b_{p,11} = \beta_{H,2} - \beta_{L-1,2}$
     $b_{p,12} = b_{p,21} = \beta_{H,3} - \beta_{L-1,3}$
     $b_{p,22} = \beta_{H,4} - \beta_{L-1,4}$
     Calculate $a_p$ vector; Let $H_i$ denote an end-point candidate. Let $\hat{v}_{p-1}$ be the HDR estimated value from the previous segment end point, then, $a_{new} = a_{old} + \begin{bmatrix} s_{(H_i-L)}(v_{p,i} - \hat{v}_{p-1}) \\ s_{(H_i-L)}^2 (v_{p,i} - \hat{v}_{p-1}) \end{bmatrix}$ where $v_{p,i}$ is the HDR value corresponding to the SDR value $s_{p,i}$, and $s_{(H_i-L)}$ is the $(H_i - L)$-th SDR value.

4. Reverse approximation
   For current $p^{th}$ segment, let H denote the known high point.
   For i = H , ... L
     Calculate $B_p$ matrix,
     $b_{p,11} = \beta_{H,2} - \beta_{L-1,2}$
     $b_{p,12} = b_{p,21} = -(\beta_{H,3} - \beta_{L-1,3})$
     $b_{p,22} = \beta_{H,4} - \beta_{L-1,4}$
     Calculate $a_p$ vector; Let $L_i$, denote a start point candidate. Let $\hat{v}_{p-1}$ be the HDR value calculated from the forward segment start point, then update, $a_{new} = a_{old} + \begin{bmatrix} -s_{(H-L_i)}(v_{p,i} - \hat{v}_{p-1}) \\ s_{(H-L_i)}^2 (v_{p,i} - \hat{v}_{p-1}) \end{bmatrix}$ where $v_{p,i}$ is the HDR value corresponding to the SDR value $s_{p,i}$, and $s_{(H-L_i)}$ is the $(H - L_i)$-th SDR value.
5. $m_p = B_p^{-1} a_p$ Adaptive Termination Conditions for Faster Convergence As described earlier, the approximation algorithm works by continually searching for polynomial segments. It starts from a starting point and then tries candidate end points along the curve; if the termination conditions are met by anyone point in the curve, it sets the end of the pivot as that point and then starts a new search. As described earlier, the terminating condition for any segment are:

(prev_error_condition && curr_error_condition)
   ||max_custom_length_condition          Rule No. 1:

That is, either
  i. there is a rising edge between two consecutive thresholding detectors, i.e., current fitting error is less than the error threshold and fitting using one point less gives error greater than the threshold, or
  ii. the segment is longer than a predefined maximum length.

(curr_error_condition && min_custom_length_condition)||max_custom_length_condition    Rule No. 2:

That is, either
  i. current fitting error is less than the error threshold and the segments should be at least of a predefined minimum length, or
  ii. the segment is longer than a predefined maximum length.

curr_error_condition && min_custom_length_condition    Rule No. 3:

That is:
  i. current fitting error is less than the error threshold, and
  ii. the segment satisfies a predefined minimum length.

In an embodiment, the error threshold starts from a fixed value and at the end of each iteration, it is reduced by k times (k<1, e.g., k=0.75). Search continues until a maximum number of iterations (n) is done.

In an embodiment, given an original error threshold (th), at each iteration the threshold is reduced by a fixed percentage (e.g., th=k*th, k<1). Assuming a worst case scenario where the optimal solution has zero error, with an error reduction by k in each iteration, given n iterations, this strategy is guaranteed to produce a solution that is at least $k^n$ closer to the optimal. Table 3 provides an example method to adjust the error target according to another embodiment that provides a faster, but sub-optimal, convergence.

TABLE 3

Adaptive error threshold adjustment

1. Set an initial error threshold th (e.g., th = 0.005)
2. Fit $2^{nd}$-order polynomials to segments one by one, from left to right (forward search) or from right to left (backward search); each segment is chosen such that the fitting error should not exceed threshold th.
3. Keep a record of the minimum error encountered after each fitting of the curve as $e_{fit}$.
4. Set new error target as $k*e_{fit}$ where k < 1, (e.g., k = 0.5)

It was observed that larger values of k improve the error performance, but at the expense of speed.

It was also observed that for some frames, the error converges to a constant value. Then, continuing with iterations adds no value in terms of error performance. This scenario can be prevented by adding one more terminating condition:
Rule No. 4:
  i. Terminate if best error in the previous iteration (e.g., $e_{fit}(t-1)$) is equal (within a threshold) to the best error in the current iteration (e.g., $e_{fit}(t)$) (e.g., $|e_{fit}(t)-e_{fit}(t-1)|<th2$).

The added termination condition stops the algorithm from searching with additional iterations if it finds that there is no improvement in performance on reducing the error threshold. It was observed that the addition of this condition did not introduce any significant visual artifacts after one applies the backward reshaping function on the image.
Constructing the Backward Reshaping LUT
  A backward LUT enables a decoder to perform the backward mapping, that is map incoming reshaped (SDR) values into the original HDR values. Since multiple HDR values can be mapped into a single SDR value, in an embodiment, without limitation, the middle HDR value is selected. Table 4 describes in pseudo-code the fast construction of a backward reshaping LUT.

TABLE 4

Construction of backward reshaping LUT

```
// Let HDR_to_SDR be the forward LUT converting
   from HDR to SDR.
// Initialize histogram array
for (i= 0; i < SDR_max; i++) hist[i] = 0; // SDR_max is the
maximum SDR intensity
// Initialize the backward LUT
for (i= 0; i < SDR_max; i++) SDR_to_HDR[i] = 0;
//Form a histogram and a cumulative table
For k=0; k < HDR_max ; k++)
{
    sdr = HDR_to_SDR[k];
    hist[sdr]++;
    SDR_to_HDR[sdr] += k;
}
//Use the histogram to update the reverse LUT
for (sdr = 0; sdr < SDR_max, sdr++)
{
    SDR_to_HDR[sdr] = SDR_to_HDR[sdr]/hist[sdr];
    // Use the average value
}
```

8. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
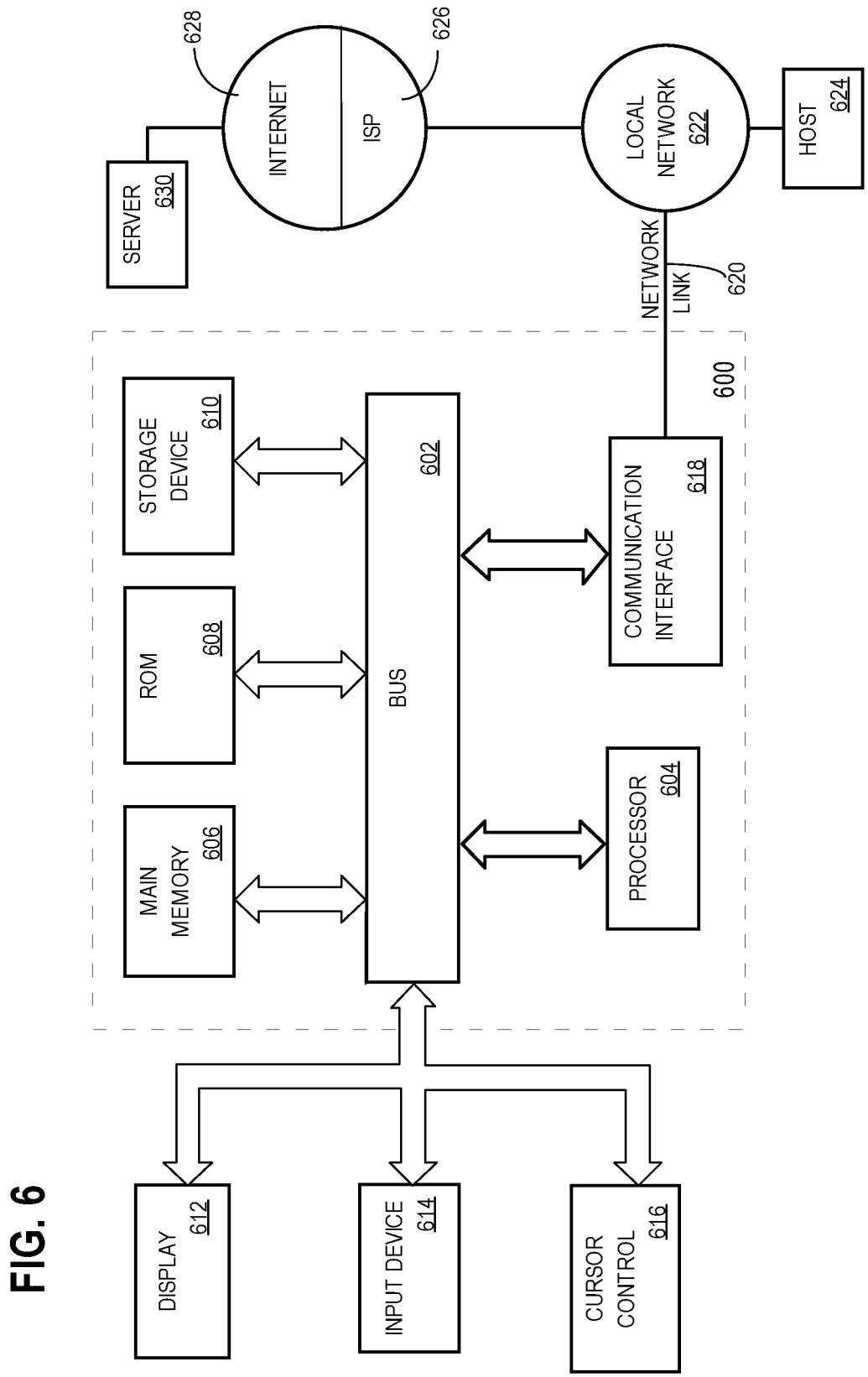
FIG. 6 illustrates an example hardware platform on which a computer or a computing device as described herein may be implemented.

For example, FIG. 6 is a block diagram that illustrates a computer system 600 upon which an example embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a liquid crystal display, for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

9. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   computing one or more statistical values based on one or more source images in a sequence of source images;

selecting, based on the one or more statistical values, an adaptive reshaping function for the one or more source images, the adaptive reshaping function mapping source codewords to reshaped codewords;

adaptively reshaping, based at least in part on the selected adaptive reshaping function, a portion of source video content to generate a portion of reshaped video content, the portion of source video content being represented by the one or more source images;

generating an approximation of an inverse of the selected adaptive reshaping function, comprising:
  determining a target lookup table (LUT) comprising key-value pairs representing the inverse of the selected adaptive reshaping function;
  generating a first approximation of the target LUT by performing a forward search from small keys to large keys in the key-value pairs of the LUT;
  generating a second approximation of the target LUT by performing a backward search from large keys to small keys in the key-value pairs of the LUT;
  selecting one of the first approximation and the second approximation by comparing approximation errors respectively generated by the forward search and the backward search;

encoding the reshaped video content and a set of adaptive reshaping parameters that define the approximation of the inverse of the selected adaptive reshaping function into a reshaped video signal, wherein the approximation of the inverse of the selected adaptive reshaping function is represented by a set of second order polynomials, the method further comprising:
  determining a continuity condition for approximating the target LUT;
  based on the continuity condition, selecting a first stopping rule for the forward search used to approximate the target LUT and a second stopping rule for the backward search used to approximate the target LUT;
  generating the first approximation based at least in part on the first stopping rule; and
  generating the second approximation based at least in part on the second stopping rule.

2. The method as recited in claim 1, wherein the portion of the reshaped video content comprises one or more reshaped images.

3. The method as recited in claim 1, wherein the one or more source images form a scene.

4. The method as recited in claim 1, wherein the target LUT is an optimal backward LUT generated by averages of source codeword values that are mapped to each reshaped codeword value in a plurality of reshaped codeword values that are used to reshape the source video content.

5. The method as recited in claim 1, wherein the one or more statistic values include at least one of a maximum value, a minimum value, a mean value, a median value, an average value, or a standard deviation value, as determined based on source codewords in the one or more source images.

6. The method as recited in claim 1, wherein at least one of the selected adaptive reshaping function or the inverse of the selected adaptive reshaping function comprises one or more of analytical functions, non-analytical functions, lookup tables (LUTs), sigmoid functions, power functions, or piecewise functions.

7. The method as recited in claim 1, wherein coefficients for polynomials in the set of polynomials are determined based on minimizing differences between values given by the polynomials and values given in a target lookup table (LUT) that represents the inverse of the selected adaptive reshaping function.

8. The method as recited in claim 1, further comprising selecting a continuity condition for generating the set of polynomials based on a type of function determined for the inverse of the selected adaptive reshaping function.

9. The method as recited in claim 1, wherein the set of polynomials are dynamically determined while the one or more source images are being processed for adaptive reshaping.

10. The method as recited in claim 1, further comprising classifying the one or more source images as one of images comprising smooth bright areas, images comprising smooth dark areas, or mid-tone images.

11. The method of claim 1, wherein the adaptive reshaping function is approximated using two or more second order polynomials and computing $m_p$ coefficients of the p-th polynomial comprises:
  determining a first (beta) look-up table (LUT) based on a function of the reshaped values for pixel values in the sequence of source images;
  determining a second (alpha) LUT based on a function of the original pixel values in a source image and the reshaped pixel values;
  determining a $B_p$ matrix based on the first LUT;
  determining an $a_p$ vector based on the second LUT; and
  computing the $m_p$ coefficients of the p-th polynomial as $B_p^{-1} a_p$.

12. The method of claim 11, wherein for a $\beta[k,j]$ element of the first LUT:

$\beta[k,j]=1$, for $k=0 \leq k \leq \text{Max}, j=0$ $\beta[k,j]=\Sigma_{i=0}^{k} s_i^j$, for $0 \leq k \leq \text{Max}, 1 \leq j \leq 4$, where Max denotes the maximum pixel value of the reshaped pixels $s_i$ corresponding to pixels $v_i$ of a source image in the sequence of source images.

13. The method of claim 11, wherein for an $\alpha[k,j]$ element of the second LUT, for $0 \leq j \leq 3$ $\alpha[k,j]=\Sigma_{i=0}^{k} v_i s_i^j$, for $0 \leq k \leq \text{Max}$, where Max denotes the maximum pixel value of the reshaped pixels $s_i$ corresponding to pixels $v_i$ of a source image in the sequence of source images.

14. The method of claim 1, wherein generating a LUT for an inverse reshaping function comprises:
  generating a histogram of reshaped values based on the forward reshaping function;
  generating a cumulative table, wherein an entry in the cumulative table comprises the sum of original pixel values mapped to the same reshaped value; and
  generating the LUT for the inverse reshaping function based on the histogram of the reshaped values and the cumulative table.

15. The method of claim 1, wherein the adaptive reshaping function is approximated using two or more second order polynomials and pivot points for the two or more polynomials are selected according to an iterative method.

16. The method of claim 15, wherein the iterative method further comprises:
  setting an initial error threshold;
  fitting segments of the adaptive reshaping function so that a fitting error of each of the one or more polynomials with a corresponding segment in the adaptive reshaping function does not exceed the initial error threshold;

determining a minimum of all the fitting errors across all segments of the adaptive reshaping function; and repeating the fitting process for a new error threshold, wherein the new error threshold is smaller than the minimum of all the fitting errors.

17. The method of claim 16, further comprising terminating the iterative method when the minimum of all fitting errors in the current iteration equals within a threshold the minimum of all fitting errors in the previous iteration.

18. In a decoder, a method for reconstructing video using a processor, the method comprising:

retrieving reshaped video content and a set of adaptive reshaping parameters defining a set of second order polynomials approximating an inverse of an adaptive reshaping function from a reshaped video signal, the inverse of the adaptive reshaping function mapping reshaped codewords to reconstructed source codewords;

the reshaped video content being generated by an upstream device based at least in part on the adaptive reshaping function, wherein the adaptive reshaping function is selected according to claim 1;

inversely mapping, based at least in part on the set of second order polynomials approximating the inverse of the adaptive reshaping function, a portion of the reshaped video content to generate a portion of reconstructed video content;

generating, based at least in part on the portion of reconstructed video content, a sequence of reconstructed images, the sequence of reconstructed images representing a reconstructed version of a sequence of source images used by the upstream device to generate the reshaped video content.

19. The method as recited in claim 18, further comprising rendering the plurality of reconstructed images in a display system.

20. The method as recited in claim 18, further comprising:

establishing, based at least in part on the set of adaptive reshaping parameters related to the approximation of the inverse of the adaptive reshaping function from the reshaped video signal, an approximation of a target lookup table (LUT) that represents the inverse of the adaptive reshaping function.

* * * * *